United States Patent
Baba et al.

(10) Patent No.: US 7,469,351 B2
(45) Date of Patent: Dec. 23, 2008

(54) MULTIPLE COMPUTER EQUIPMENT AND MANAGEMENT METHOD FOR DETERMINING NUMBER OF AC-DC POWER MODULES TO BE OPERATED BY CALCULATING POWER CONSUMPTION BASED UPON SYSTEM INFORMATION

(75) Inventors: Takashige Baba, Kodaira (JP); Kazuhide Horimoto, Hachioji (JP)

(73) Assignee: Hitachi, Ltd., Tokyo (JP)

( * ) Notice: Subject to any disclaimer, the term of this patent is extended or adjusted under 35 U.S.C. 154(b) by 484 days.

(21) Appl. No.: 11/407,973

(22) Filed: Apr. 21, 2006

(65) Prior Publication Data
US 2006/0242438 A1   Oct. 26, 2006

(30) Foreign Application Priority Data
Apr. 22, 2005   (JP)   ............................. 2005-124517

(51) Int. Cl.
   *G06F 1/26*   (2006.01)
(52) U.S. Cl. ...................... 713/300; 713/320; 713/323; 713/330
(58) Field of Classification Search ................. 713/300
   See application file for complete search history.

(56) References Cited

U.S. PATENT DOCUMENTS 6,504,266 B1 * 1/2003 Ervin ........................ 307/29
6,785,827 B2   8/2004 Layton et al.
7,337,333 B2 * 2/2008 O'Conner et al. ............ 713/300
2005/0071690 A1 * 3/2005 Pomaranski et al. ........ 713/300

FOREIGN PATENT DOCUMENTS

JP   2002-032153   1/2002

* cited by examiner

Primary Examiner—Nitin C Patel
(74) Attorney, Agent, or Firm—Mattingly, Stanger, Malur & Brundidge, PC

(57) ABSTRACT

An object of the present invention is to provide a management technique for managing power supply modules. In multiple computer equipment 100, in response to a load state, if an operation system 1101 issues a command that changes a processor state of a processor 1021 to a sleep state, a management module 107 is notified through a management network MI that the processor state has changed. The management module 107 holds a system information 108, and performs the steps of: updating system information 108 because the processor state has changed; from this system information 108, calculating the power consumption required for the multiple computer equipment 100; determining the number of required AC-DC power supply modules 1061, 1062, . . . to be operated; and changing the number of operating AC-DC power supply modules 1061, 1062, . . . by use of a control interface PA.

17 Claims, 17 Drawing Sheets

FIG.2

| CPU MODULE No. K201 | SYSTEM STATE K202 | KIND OF PROCESSOR #0 K2031 | KIND OF PROCESSOR #1 K2032 | ... |
|---|---|---|---|---|
| 0 | B0 | CP1 | CP1 | |
| 1 | B0 | CP2 | CP2 | |
| 2 | B0 | CP1 | CP1 | |
| 3 | B1 | CP1 | CP1 | |
| 4 | B3 | CP1 | CP1 | |
| ... | | | | |

| CPU MODULE No. K301 | PROCESSOR #0 K3031 | PROCESSOR #1 K3032 | ... FT3 |
|---|---|---|---|
| 0 | A0 | A3 | |
| 1 | A0 | A1 | |
| 2 | A0 | A1 | |
| 3 | SS | SS | |
| 4 | SS | SS | |
| ... | | | |

| KIND OF PROCESSOR | A0 | A1 | A2 | A3 | ... | B0 | B1 | B2 | B3 | ... | PROCESSOR NAME |
|---|---|---|---|---|---|---|---|---|---|---|---|
| CP1 | 80 | 80 | 0 | 0 | | 80 | 80 | 0 | 0 | | Xeon (2.8GHz) |
| CP2 | 100 | 100 | 0 | 0 | | 100 | 100 | 0 | 0 | | Itanium 2 (900MHz) |
| ... | | | | | | | | | | | |

UNIT (W)

MULTIPLE COMPUTER EQUIPMENT AND MANAGEMENT METHOD FOR DETERMINING NUMBER OF AC-DC POWER MODULES TO BE OPERATED BY CALCULATING POWER CONSUMPTION BASED UPON SYSTEM INFORMATION

CLAIM OF PRIORITY

The present application claims priority from Japanese application JP2005-124517, filed on Apr. 22, 2005, the content of which is hereby incorporated by reference into this application.

BACKGROUND OF THE INVENTION

1. Field of the Invention

The present invention relates to management technologies used for computer equipment, and more particularly to technologies applied effectively to control of a power supply included in multiple computer equipment, which is composed of two or more sets of computer equipment mounted in a case.

2. Description of the Related Arts

A WEB server, an application server, and a database server used for an operation system of a company use computer equipment comprising a processor, a memory, an IO device, and a storage device. In recent years, multiple computer equipment has been coming into wider use in order to achieve space saving computer equipment and to place, at one location, servers included in a system so as to manage the servers in an integrated manner. A blade server is well known as multiple computer equipment. This blade server is configured such that components of computer equipment, such as a CPU, a memory, and an HDD, are placed in a thin case called a CPU module or a CPU blade and the plurality of CPU modules are placed in a case called a chassis or an enclosure. Thus, high-density multiple computer equipment is realized. As a result, further space saving can be achieved as compared with the conventional computer equipment. In addition, the blade server is equipped with AC-DC power supply modules for supplying the electric power to the components of the computer equipment in the chassis. In general, the blade server is equipped with a plurality of AC-DC power supply modules so that multiple computer equipment can continue operating even if a failure occurs in one of the AC-DC power supply modules. With the objective of achieving the integrated management of the two or more sets of computer equipment as described above, the blade server is in general equipped with a management module for controlling and managing modules constituting the computer equipment, such as a CPU module, and the AC-DC power supply modules, located in the chassis. The management module performs: for example, ON/OFF control of the power supply to the modules including the CPU module and the AC-DC power supply modules; monitoring of the temperature in the CPU module and the temperature in the chassis; and fault monitoring and fault handling of the modules including the CPU module and the AC-DC power supply modules. An administrator of the blade server is allowed to access this management module by means of, for example, telnet, and thereby to control ON/OFF of the power supply of the computer equipment in the blade server. Further, in order to manage a system including an operation system and an application operating on computer equipment, management software that operates on computer equipment, i.e., a management server located outside the blade server is used. This management server is connected to the management module described above through a management network, for example, through a local area network (LAN). By communicating with the management module, the management server can control ON/OFF of the power supply of the computer equipment in the blade server. Moreover, this management server is connected to individual computer equipment included in the blade server through the management network, and manages an operation system, applications, and the like, which operate on the computer equipment. Here, agent software which operates on the computer equipment is in general used for communications between the management software and the computer equipment.

Incidentally, this kind of blade server is described in Japanese Patent Laid-open No. 2002-32153 ("Cartridge type server unit, and case for housing the server unit").

SUMMARY OF THE INVENTION

However, the inventor found out that when the AC-DC power supply modules included in the multiple computer equipment described above are managed, the undermentioned problems will arise.

To be more specific, a maximum value of the output power required for each of the AC-DC power supply modules is specified on the basis the largest power consumption required when all modules which are components constituting sets of computer equipment located in the chassis are operating. Accordingly, if the sets of computer equipment located in the chassis are partially in a power OFF state or in a sleep state, or if a processor included in computer equipment is in the sleep state, the power consumption decreases. Therefore, for the operation of the sets of computer equipment located in the chassis, the electric power is supplied by the AC-DC power supply modules having the excessive output power. In this case, the operation is kept in a low load state in which the output power per AC-DC power supply module is smaller than the maximum value of the output power of each AC-DC power supply module. In general, an AC-DC power supply module inefficiently works in the low load state. Therefore, the electric power is wastefully consumed for the required power consumption. FIG. 16 is a graph illustrating the typical relationship between a load of an AC-DC power supply module (horizontal axis) and the power consumption (vertical axis). A curve 1601 shown in FIG. 16 indicates the electric power that is consumed by the AC-DC power supply module for the load connected to the output end of the AC-DC power supply module. Judging from FIG. 16, even in a state in which the load is 0, W0 is required as the power consumption.

Although a value of the W0 depends on the performance of the AC-DC power supply module, in the case of AC-DC power supply modules used for computer equipment, the value is about 10 to 50 watts (W). When the load is low (LL), the power supply is inefficient, that is, the wasteful power consumption is large. On the other hand, when the load is normal (SL), the power supply is efficient, that is, the wasteful power consumption is small. Since the blade server incorporates a plurality of AC-DC power supply modules, there arises a problem of wasteful total power consumption: (the wasteful power consumption (W))×(the number of AC-DC power supply modules) (W).

A publicly known example for overcoming such a problem is U.S. Pat. No. 6,785,827 ("System for determining servers power supply requirement by sampling power usage values thereof at a rate based upon the criticality of its availability"). In the technology of this publicly known example, the power consumption required for each set of computer equipment in a system is monitored to calculate the total amount of the required power consumption, and then the number of required AC-DC power supply units is determined on the basis of the required power consumption. However, in this method of the publicly known example, if many sets of computer equipment are suddenly brought into a power ON state, or if a system returns from a sleep state to a normal operation state, or if a-processor returns from the sleep state to the normal operation state, there is a problem in that it is not possible to cope with the sudden increase in power consumption by calculating the maximum power consumption as a result of monitoring the power consumption, and then by determining the number of required power supply units.

An object of the present invention is to provide a technology that can control the number of operating AC-DC power supply modules even in a case where the power consumption suddenly changes as described above, and thereby making it possible to reduce the wasteful power consumption.

The above-mentioned and other objects of the present invention and new features thereof will be made clear by the description in this specification and with reference to attached drawings.

In order to achieve the above-mentioned objects, according to a first aspect of the present invention, there is provided multiple computer equipment comprising: at least one CPU module comprising a processor, and a DC-DC power supply for supplying power supply to the processor; AC-DC power supply modules each being connected to each of the CPU modules, each of the AC-DC power supply modules comprising an AC-DC power supply unit for supplying the required amount of power to the DC-DC power supply in response to an operation state of the processor; a CPU module controller included in the CPU module, the CPU module controller controlling the power supply even when the processor is not operating, and the CPU module controller being connected to the AC-DC power supply modules through a power supply control interface so as to control the output of the AC-DC power supply modules; and a management module which is connected to the CPU module controller through a management interface so as to control the power supply of the CPU module. The management module holds system information including status information of the processor, operation information of the CPU module, and power consumption information provided on a processor kind basis; and performs the steps of: on the basis of the system information, calculating the power consumption required for each of the CPU modules; and calculating the number of operating AC-DC power supply modules required to ensure the calculated power consumption, and on the basis of the result of the calculation, determining the number of AC-DC power supply modules to be operated.

According to a second aspect of the present invention, there is provided multiple computer equipment comprising: at least one AC-DC power supply module comprising an AC-DC power supply unit, the AC-DC power supply module supplying the electric power to each equipment; a CPU module including: at least one processor; a DC-DC power supply for DC-DC converting the electric power supplied from the AC-DC power supply module; and a CPU module controller for controlling the power supply even when the processor is not operating, the CPU module controller being connected to the AC-DC power supply module through a power supply control interface so as to control the output of the AC-DC power supply module; a management module which is connected through a management interface so as to control the power supply of the CPU module; and an operation system and system firmware, both of which operate on a CPU module basis when the power supply of the CPU module is turned ON. In addition, if the processor has a sleep state, the processor has either at least one state as a sleep state of the processor, or at least one state as a system sleep state provided on a CPU module basis; if a state of the processor changes from a normal operation state to a sleep state, the CPU module controller comprises: a timer function of keeping the processor state in the sleep state for a fixed period of time by a command for making a transition to the sleep state, the command being issued from the system firmware; and a function of notifying the management module that the processor state has changed; if the processor state changes from the sleep state to the normal operation state, the CPU module controller comprises: a function of, on completion of the timer function, notifying the management module that the processor state has changed; and a function of, on receipt of a notification from the management module that settings of the AC-DC power supply module have been completed, sending the processor an interrupt request to return from the sleep state to the normal operation state; the management module comprises, as system information, CPU module operation information including: CPU module power ON or OFF; a normal operation state, and a sleep state, of a system of the CPU module; and information about a kind of included processor; as processor information, the management module comprises: processor state information including a normal operation state, and a sleep state, of a processor in the CPU module; and processor power-consumption information that is required for each state on a processor kind basis; and if the processor state changes from the normal operation state to the sleep state, or if the processor state changes from the sleep state to the normal operation state, the management module comprises: a control function of: on receipt of a notification from the CPU module controller that the processor state has changed, calculating the power consumption required for the whole multiple computer equipment from the CPU module operation information, the processor state information, and the processor power-consumption information; on the basis of the power consumption, calculating the number of AC-DC power supply modules to be operated; and if it is necessary to change the number of AC-DC power supply modules that are operating, changing the number of operating AC-DC power supply modules that are operating; and a notification function of notifying the CPU module controller of the completion of settings, the completion of settings indicating that the AC-DC power supply modules are stably operating.

According to a third aspect of the present invention, there is provided a management method of multiple computer equipment. The multiple computer equipment includes:

at least one AC-DC power supply module for supplying the electric power to the whole equipment; a CPU module comprising: at least one processor; a DC-DC power supply for DC-DC converting the electric power supplied from the AC-DC power supply module; and a CPU module controller for controlling the power supply even when the processor is not operating, the CPU module controller being connected to the AC-DC power supply module through a power supply control interface so as to control the output of the AC-DC power supply module; a management module which is connected through a management interface so as to control the power supply of the CPU module; and an operation system and system firmware, both of which operate on a CPU module basis when the power supply of the CPU module is turned ON. In addition, if the processor has a sleep state, the processor has either at least one state as a sleep state of the processor, or at least one state as a system sleep state provided on a CPU module basis; if the processor state changes from a normal operation state to the sleep state, the operation system operating on the CPU module performs the step of: issuing to the system firmware a command for changing the processor state from the normal operation state to the sleep state; on receipt of the command, the system firmware operating on the CPU module performs the steps of: notifying the CPU module controller that the processor state has changed; and performing the sleep control of the processor; the CPU module controller performs the step of: notifying the processor management module that the processor state has changed; and on receipt of this notification, the processor management module performs the steps of: updating processor state information including a normal operation state, and the sleep state, of the processor in the processor CPU module; calculating the power consumption required for the whole multiple computer equipment from information including: the processor state information; CPU module operation information including a power ON/OFF state of the processor CPU module, the normal operation state, and the sleep state, of the system of the processor CPU module, and information about a kind of included processor; and processor power-consumption information required for each state on a processor kind basis; on the basis of the power consumption, calculating the number of AC-DC power supply modules to be operated; and if it is necessary to change the number of AC-DC power supply modules that are operating, changing the number of AC-DC power supply modules that are operating.

Effects that can be achieved from the typical features of the present invention disclosed in this application concerned will be briefly described below.

In multiple computer equipment, even if an operation state of computer equipment changes, it is possible to control the number of operating AC-DC power supply modules in response to a processor state and a system state. Therefore, it is possible to prevent the electric power from becoming inefficient, and thereby to reduce the wasteful power consumption.

BRIEF DESCRIPTION OF THE DRAWINGS

FIG. 2 is an explanatory diagram illustrating an example of CPU module operation information held by a management module installed in the multiple computer equipment shown in FIG. 1;

FIG. 3 is an explanatory diagram illustrating an example of processor state information held by the management module installed in the multiple computer equipment shown in FIG. 1;

FIG. 4 is an explanatory diagram illustrating an example of processor power-consumption information held by the management module installed in the multiple computer equipment shown in FIG. 1;

DESCRIPTION OF THE PREFERRED EMBODIMENTS

Figure 1:
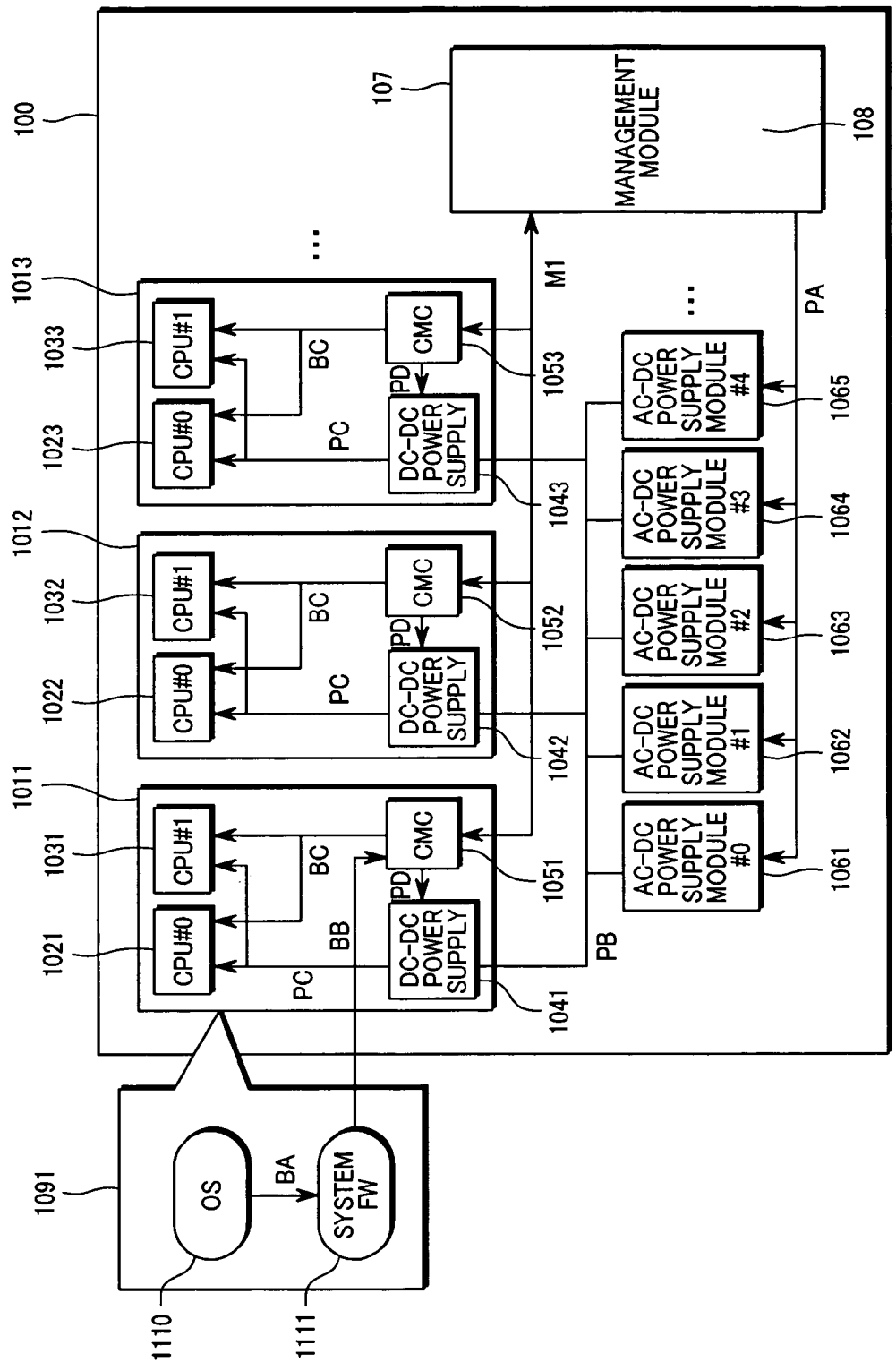
FIG. 1 is a block diagram illustrating multiple computer equipment according to one embodiment of the present invention.

Embodiments of the present invention will be described in detail with reference to drawings below. Note that in order to illustrate the embodiments, the same parts are in principle designated by similar reference numerals in all of the drawings, and therefore, in principle the description of the parts will not be repeated.

Figure 3:
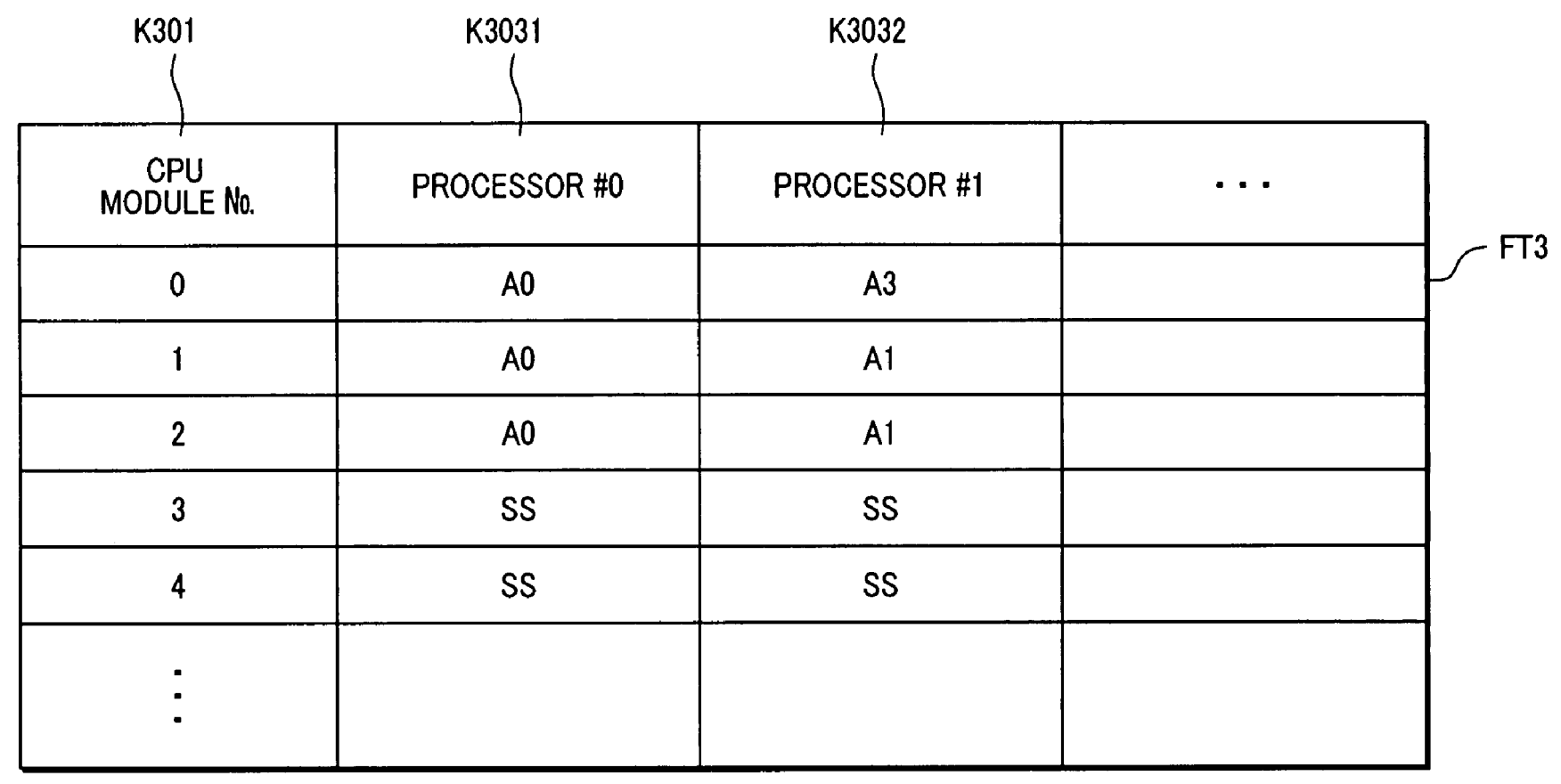

First of all, a configuration of multiple computer equipment according to one embodiment of the present invention will be described. FIG. 1 is a block diagram illustrating the multiple computer equipment according to one embodiment of the present invention. FIG. 2 is an explanatory diagram illustrating an example of CPU module operation information held by a management module installed in the multiple computer equipment shown in FIG. 1. FIG. 3 is an explanatory diagram illustrating an example of processor state information held by the management module installed in the multiple computer equipment shown in FIG. 1. FIG. 4 is an explanatory diagram illustrating an example of processor power-consumption information held by the management module installed in the multiple computer equipment shown in FIG. 1. As shown in FIG. 1, the multiple computer equipment 100 according to this embodiment comprises: one or more CPU modules 1011, 1012, 1013, . . . ; one or more AC-DC power supply modules 1061, 1062, 1063, 1064, 1065, . . . ; and a management module 107. The CPU module 1011 (1012, 1013, . . . ), which is configured as one printed circuit board (or a plurality of printed circuit boards connected to one another), includes: processors 1021, 1031, . . . (1022, 1032, . . . , 1023, 1033, . . . ); a DC-DC power supply 1041 (1042, 1043, . . . ); and a CPU module controller 1051 (1052, 1053, . . . ). The CPU module controller 1051 (1052, 1053, . . . ) is formed of, for example, a chip set such as a north bridge, a chip set used for management such as a baseboard management controller, or the like. Next, taking the CPU module 1011 as an example, the connection relationship in the CPU module will be described. The other CPU modules 1012, 1013, . . . also have the same connection relationship. The CPU module controller 1051 is connected to the DC-DC power supply with a control line PD so that the CPU module controller 1051 can control the DC-DC power supply. The CPU module controller 1051 is connected to the processors 1021, 1031, . . . with control lines BC so that the CPU module controller 1051 can control the processors 1021, 1031, . . . , for example, the CPU module controller 1051 can issue a request to interrupt the processor. In addition, the DC-DC power supply 1041 is connected to the processors 1021, 1031, . . . with power supply lines PC so that the power is supplied to the processors 1021, 1031, . . . . Here, software 1091 operating in the CPU module 1011 includes an operation system 1101, and system firmware 1111. A connection is made between the operation system 1101 and the system firmware 1111 through a software interface BA. The system firmware 1111 is connected to the CPU module controller 1051 through a software interface BB. Software operating in the other CPU modules 1012, 1013, . . . also has the same configuration as that of the software 1091, and also has the same connection relationship as that of the software 1091. Next, the connection relationship between modules in the multiple computer equipment 100 will be described. The management module 107 is connected to the CPU module controllers 1051, 1052, 1053, . . . through a management interface MI. As the management interface MI, for example, Ethernet (registered trademark) or I2C (Inter-Integrated Circuit) is used. By use of this management interface MI, the management module 107 manages the CPU modules 1011, 1012, 1013, . . . , and manages ON/OFF switching of the power supply, monitoring of a failure, checking of the presence, and the like. In addition, the management module 107 is connected to the AC-DC power supply modules 1061, 1062, 1063, 1064, 1065, . . . , through an interface PA for controlling the AC-DC power supply modules. As the interface PA for controlling the AC-DC power supply modules, for example, I2C (Inter-Integrated Circuit) is used. By use of the interface PA for controlling the AC-DC power supply modules, the management module 107 performs, for example, the output control, and monitoring of a failure, of the power supply modules 1061, 1062, 1063, 1064, 1065, . . . . The power supply modules 1061, 1062, 1063, 1064, 1065, . . . , are supplied with the AC electric power from the power supply unit outside the multiple computer equipment (for example, from a breaker power supply unit), and supplies the CPU modules 1011, 1012, 1013, . . . with the DC electric power by use of the power supply line PB. The management module 107 holds system information 108 so as to manage the multiple computer equipment 100. This system information 108 will be described in detail with reference to FIGS. 2 through 4.

The system information 108 comprises at least CPU module operation information FT2 shown in FIG. 2, processor state information FT3 shown in FIG. 3, and processor power-consumption information FT4 shown in FIG. 4. The CPU module operation information FT2, expressed in tabular form, includes the columns of: CPU module number K201; System state K202; and Kind of processor K2031, K2032, . . . , each indicating a kind of processor included in each slot of a CPU module. Each row of the CPU module number K201 corresponds to, for example, each of the CPU modules 1011, 1012, 1013, . . . shown in FIG. 1. The System state K202 indicates a normal operation state of a system, or a sleep state (including a power OFF state of the system). In this embodiment, B0 denotes the normal operation state of the system, and Bx (x=1, 2, 3, . . . ) denotes the system sleep state. An example in which states of this system are defined includes system sleep states S0, S1, . . . , S5 in ACPI (Advanced Configuration and Power Interface).

Information corresponding to the Kind of processor K2031, K2032, . . . , indicates a kind of each processor included in the system. The kinds of processors with which the multiple computer equipment can be equipped are expressed by use of unique identifiers, for example, CP1, CP2, . . . . In this embodiment, for example, CP1 denotes Xeon 2.8 GHz; and CP2 denotes Itanium 2 900 MHz. The processor state information FT3 shown in FIG. 3, expressed in tabular form, includes the columns of: CPU module number K301; and Processor state K3021, K3022, . . . , each indicating a state of processor included in each slot of a CPU module. Each row of the CPU module number K301 corresponds to, for example, each of the CPU modules 1011, 1012, 1013, . . . shown in FIG. 1. The Processor state K3021, K3022, . . . indicates a normal operation state, or a sleep state (including a system sleep state), of each processor included in the CPU module. In this embodiment, A0 denotes a normal operation state of a processor; Ax (x=1, 2, 3, . . . ) denotes a sleep state of the processor; and SS denotes a system sleep state (including a power OFF state of the system). An example in which states of this processor are defined includes processor sleep states P0, P1, P2, P3 in ACPI (refer to Advanced Configuration and Power Interface Specification Revision 3.0 (issued on Sep. 2, 2004)). The processor power-consumption information FT4 shown in FIG. 4, expressed in tabular form, includes the columns of: Kind of processor K401; Power consumption K4021, K4022, K4023, K4024, . . . , which correspond to processor states A0, A1, A2, A3, . . . respectively; and Power consumption K4031, K4032, K4033, K4034, . . . , which correspond to system states B0, B1, B2, B3, . . . respectively. In addition, the processor power-consumption information FT4 may include Processor name K404. Identifiers included in the Kind of processor K401 correspond to the unique identifiers CP1, CP2, . . . of processors shown in FIG. 3, with which the multiple computer equipment can be equipped. The Power consumption K4021, K4022, K4023, K4024, . . . indicate, on a processor kind basis, the required power consumption of a processor in the processor states A0, A1, A2, A3, . . . respectively. On the other hand, the Power consumption K4031, K4032, K4033, K4034, . . . indicate, on a processor kind basis, the required power consumption of a processor in the system states B0, B1, B2, B3, . . . respectively. What will be described next is an example in which the power consumption required for the multiple computer equipment 100 is calculated by use of the system information FT2, FT3, FT4. In the case of the CPU module #0, the processor kind of the processor #0 is CP1, and the processor state of the processor #0 is A0. Next, the processor kind of the processor #1 is CP1, and the processor state of the processor #1 is A3. Accordingly, by reading out the processor power-consumption information FT4, the power consumption required for the CPU module #0 is calculated as follows: 80 (W)+0 (W)=80 (W). When the system state is B0, the system enters a normal operation state. Accordingly, the power consumption is read out not from the Power consumption K4031 corresponding to the B0 state, but from the Power consumption K4021, K4022, K4023, K4024, . . . corresponding to the processor states A0, A1, A2, A3, . . . .

If the power consumption is calculated for the other CPU modules in like manner, the following values are acquired:

CPU module #1:100 (W)+100 (W)=200 (W);

CPU module #2: 80 (W)+80 (W)=160 (W);

CPU module #3: 80 (W)+80 (W)=160 (W); and

CPU module #4: 0 (W)+0 (W)=0 (W)

As a result, the required power consumption becomes 600 (W) in total. As a matter of course, because even components other than processors, which include a memory, a HDD, and an I/O card, consume the electric power in computer equipment, if the power consumption in the processor power-consumption information FT4 does not include the components other than the processors, it is necessary to add the power consumption of the components other than the processors to the above-mentioned required power consumption that has been calculated. The management module 107 calculates the number of required AC-DC power supply modules by dividing the required power consumption by the maximum output electric power per AC-DC power supply module, and thereby controls the number of AC-DC power supply modules to be operated. Incidentally, if an AC-DC power supply module is operated with N+1 redundancy, the number of AC-DC power supply modules to be operated is obtained by adding 1 to the number of required AC-DC power supply modules that has been calculated above. Here, the N+1 redundancy means a function by which, by operating the required AC-DC power supply modules, the number of which is increased by one, even if a failure occurs in one of the operating AC-DC power supply modules, the computer equipment can continuously operate because the remaining AC-DC power supply modules are operating.

Figure 5:
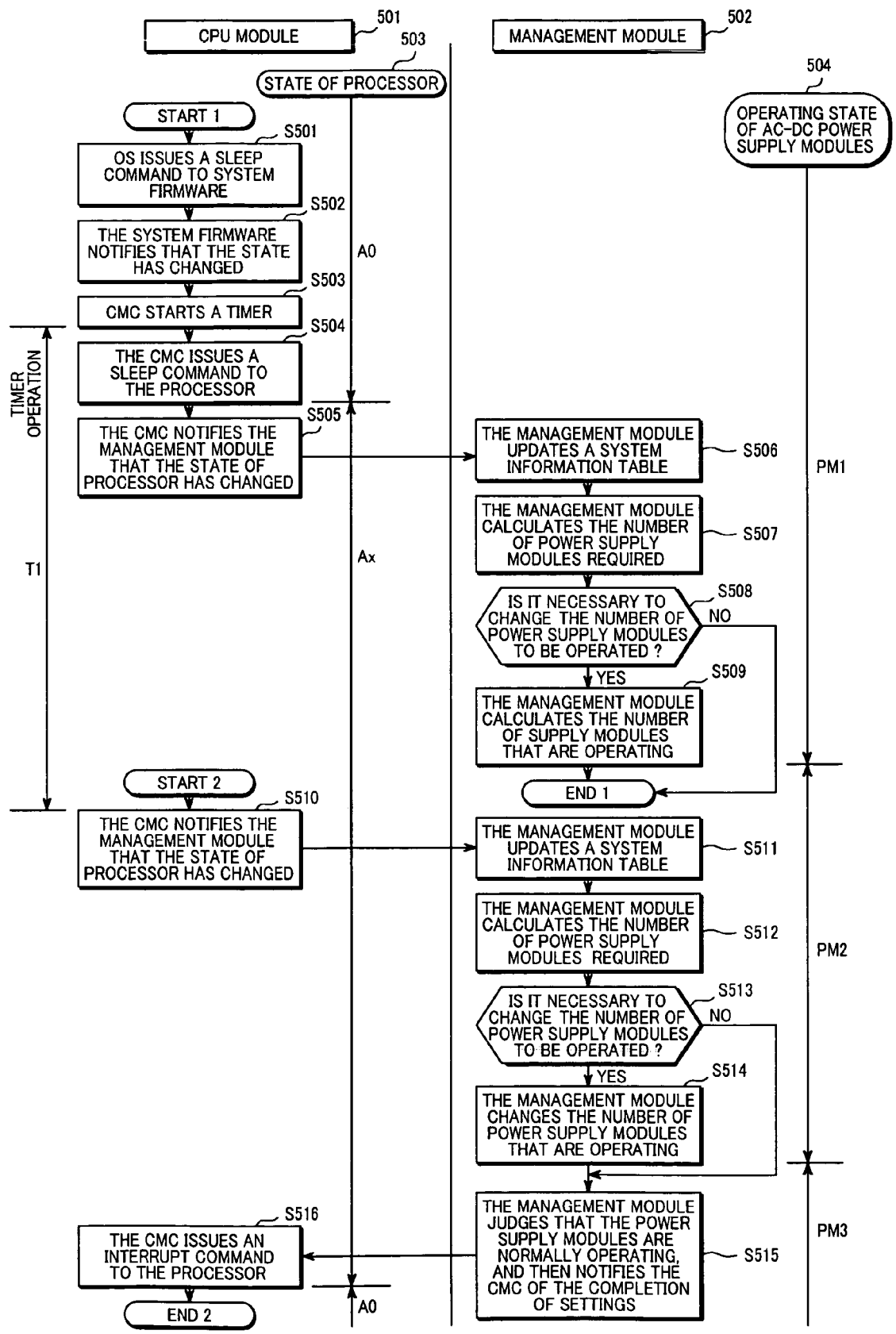
FIG. 5 is a flowchart illustrating a management method for managing AC-DC power supply modules applied in a case where a processor state of the multiple computer equipment shown in FIG. 1 changes.
Figure 6:
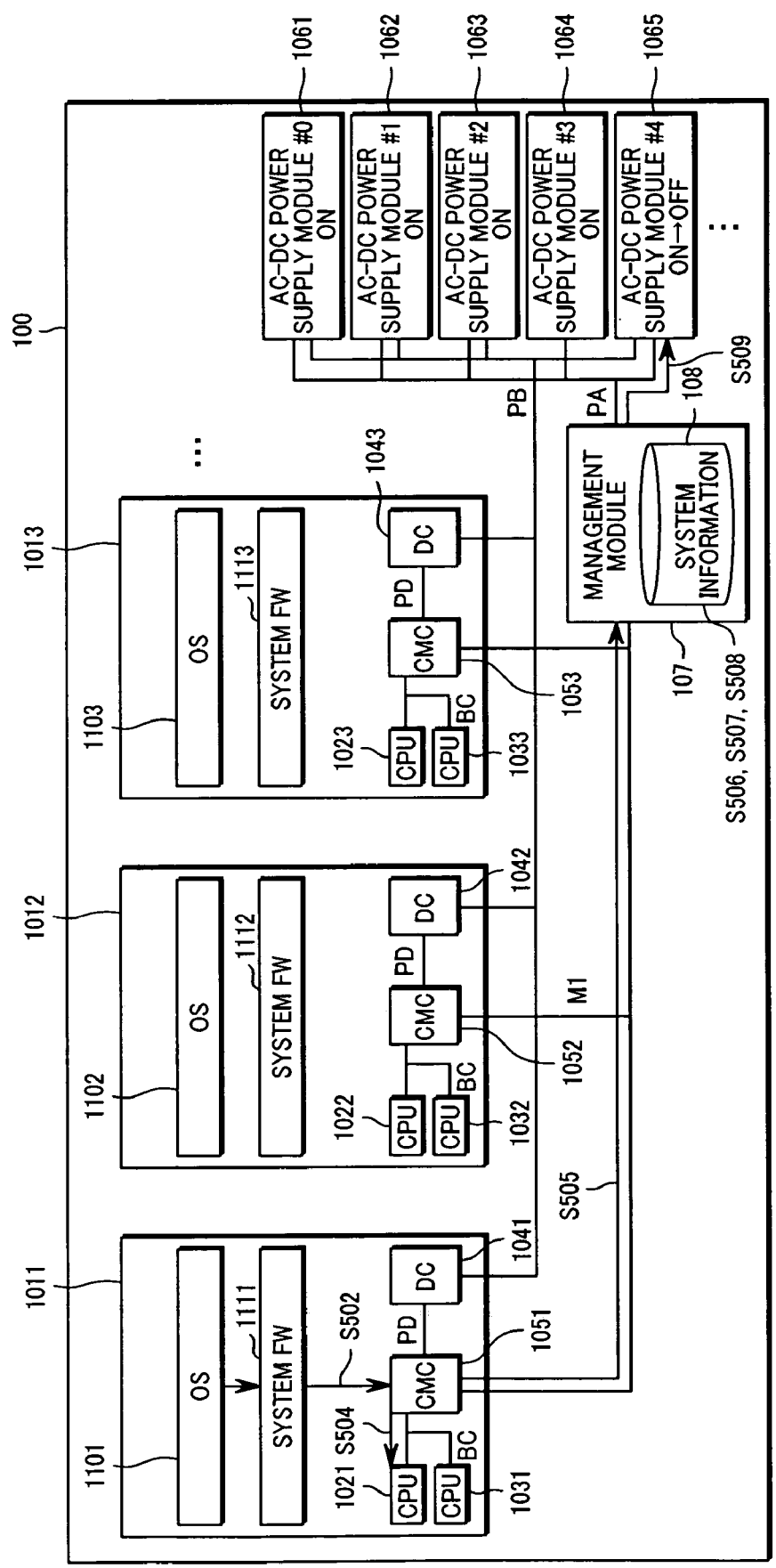
FIG. 6 is an explanatory diagram illustrating an example of a management method for managing AC-DC power supply modules applied in a case where the processor state of the multiple computer equipment shown in FIG. 1 changes from a normal operation state to a sleep state.
Figure 7:
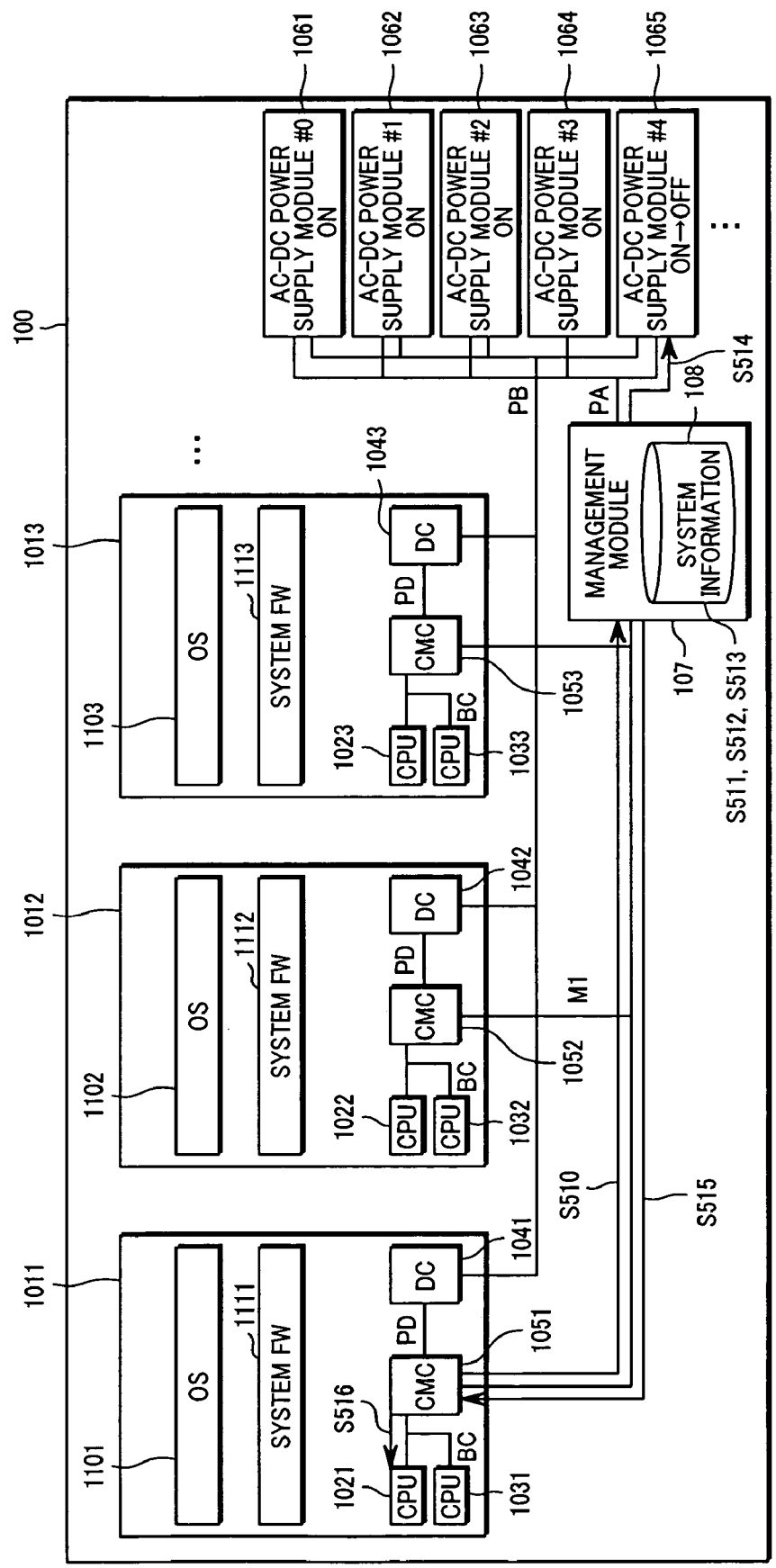
FIG. 7 is an explanatory diagram illustrating an example of a management method for managing AC-DC power supply modules applied in a case where the processor state of the multiple computer equipment shown in FIG. 1 changes from the sleep state to the normal operation state.

Next, a management method for managing AC-DC power supply modules in the multiple computer equipment according to the embodiment of the present invention described above will be described with reference to a flowchart. First of all, a management method for managing AC-DC power supply modules applied in a case where a processor state changes to a sleep state will be described. FIG. 5 is a flowchart illustrating a management method for managing AC-DC power supply modules applied in a case where a processor state of the multiple computer equipment shown in FIG. 1 changes. FIG. 6 is an explanatory diagram illustrating an example of a management method for managing AC-DC power supply modules applied in a case where the processor state of the multiple computer equipment shown in FIG. 1 changes from a normal operation state to a sleep state. FIG. 7 is an explanatory diagram illustrating an example of a management method for managing AC-DC power supply modules applied in a case where the processor state of the multiple computer equipment shown in FIG. 1 changes from the sleep state to the normal operation state. FIG. 5 illustrates a flowchart of a management method for managing AC-DC power supply modules 1061, 1062, 1063, 1064, 1065, . . . in FIGS. 6, 7 applied in a case where, for example, a processor state of the processor 1021 included in the CPU module 1011 shown in FIGS. 6, 7 changes from A0, which is the normal operation state, to Ax (x=1, 2, . . . ), which is the sleep state, and then returns to A0 that is the normal operation state. A flowchart illustrating how the processor state changes from the normal operation state A0 to the sleep state Ax (x=1, 2, . . . ) corresponds to steps from start1 to end1. FIG. 6 is a diagram relating to this flowchart. A flowchart illustrating how the processor state changes from the sleep state Ax (x=1, 2, . . . ) to the normal operation state A0 corresponds to steps from start2 to end2. FIG. 7 is a diagram relating to this flowchart. It is to be noted that S501 through S516 described in FIGS. 6 and 7 correspond to steps S501 through S516 included in the flowchart shown in FIG. 5. A CPU module 501 shown in FIG. 5 corresponds to the operation flow of the CPU module 1011 shown in FIGS. 6 and 7; and a management module 502 shown FIG. 5 corresponds to the operation flow of the management module 107 shown in FIGS. 6 and 7. A processor state 503 corresponds to a processor state of the processor 1021 in the operation flow. An operation state of AC-DC power supply modules 504 corresponds to a change in the number of AC-DC power supply modules that are operating. In the description of this embodiment, for example, five AC-DC power supply modules are operating in PM1; four AC-DC power supply modules are operating in PM2; and five AC-DC power supply modules are operating in PM3. Moreover, T1 specifies a length of time required before the processor returns from the sleep state. A value of T1 differs depending on the sleep state Ax (x=1, 2, . . . ).

The flowchart illustrating how the processor state changes from the normal operation state A0 to the sleep state Ax (x=1, 2, . . . ) will be described below. On the basis of the load of a processor and power-saving settings of the operation system, the operation system 1101 determines a sleep state Ax (x=1, 2, . . . ) to which the processor makes a transition, and then uses a software interface to notify the system firmware 1111 of the determined sleep state Ax (x=1, 2, . . . ) to which the transition is made (step S501). By use of the software interface, the system firmware 1111 notifies the CPU module controller 1051 of the sleep state Ax (x=1, 2, . . . ) to which the transition is made (step S502). The CPU module controller 1051 sets a timer thereof at the time T1 corresponding to the sleep state Ax (x=1, 2, . . . ) to which the transition is made, and then starts the timer (step S503). Using a control path BC, the CPU module controller 1051 issues to the processor 1021 a command for making a transition to the sleep state Ax (x=1, 2, . . . ) (step S504). As a result, the processor 1021 makes a transition from the normal operation state A0 to the sleep state Ax (x=1, 2, . . . ). By use of a communication path MI, the CPU module controller 1051 notifies the management module 107 that the processor 1021 has made the transition to the sleep state Ax (x=1, 2, . . . ) (step S505). The management module 107 changes a state included in the processor state information FT3 to the sleep state Ax (x=1, 2, . . . ), the state included in the processor state information FT3 corresponding to the processor that has made the transition to the sleep state (step S506). Because the system information 108 has been updated, the management module 107 calculates the required power consumption on the basis of the system information 108 (information of FT2, FT3, and FT4), and also calculates the number of required AC-DC power supply=modules (step S507). The management module 107 judges whether or not there is a change in the number of AC-DC power supply modules that are operating (step S508). If there is a change in the number of operating AC-DC power supply modules, the management module 107 controls the output of the AC-DC power supply modules 1061, 1062, 1063, 1064, 1065, . . . by use of a communication path PA used for control so that the number of operating AC-DC power supply modules is changed (step S509). In this embodiment, for example, the output of the AC-DC power supply module 1065 is stopped so that a state in which five AC-DC power supply modules 1061, 1062, 1063, 1064, 1065 are operating is changed to a state in which four AC-DC power supply modules are operating. On the other hand, if there is no change in the number of operating AC-DC power supply modules, the operation flow ends.

Next, the flowchart illustrating how the processor state changes from the sleep state Ax (x=1, 2, . . . ) to the normal operation state A0 will be described below. As soon as the time-out of the timer set in the step S503 occurs, the CPU module controller 1051 uses the communication path MI to notify the management module 107 that the processor 1021 makes a transition to the normal operation state A0 (step 510). The management module 107 changes a state included in the processor state information FT3 to the normal operation state A0, the state included in the processor state information FT3 corresponding to the processor that has made the transition to the sleep state (step S511). Because the system information 108 has been updated, the management module 107 calculates the required power consumption on the basis of the system information 108 (information of FT2, FT3, and FT4), and also calculates the number of required AC-DC power supply modules (step S512). The management module 107 judges whether or not there is a change in the number of AC-DC power supply modules that are operating (step S513). If there is a change in the number of operating AC-DC power supply modules, the management module 107 controls the output of the AC-DC power supply modules 1061, 1062, 1063, 1064, 1065, . . . by use of the communication path PA used for control so that the number of operating AC-DC power supply modules is changed (step S514). In this embodiment, for example, the output of the AC-DC power supply module 1065 is turned ON so that a state in which four AC-DC power supply modules 1061, 1062, 1063, 1064 are operating is changed to a state in which five AC-DC power supply modules are operating. On the other hand, if there is no change in the number of operating AC-DC power supply modules, the process returns to the operation flow in the step S515. Using the communication path PA used for control, the management module 107 judges that the AC-DC power supply modules 1061, 1062, 1063, 1064, 1065, . . . normally supply the power, and then notifies the CPU module controller 1051 of the completion of settings of the AC-DC power supply modules (step 515). Using the control path BC, the CPU module controller 1051 issues to the processor 1021 a command for making a transition to the normal operation state A0 (step S516). As a result, the processor 1021 makes the transition from the sleep state Ax (x=1, 2, . . . ) to the normal operation state A0.

Figure 8:
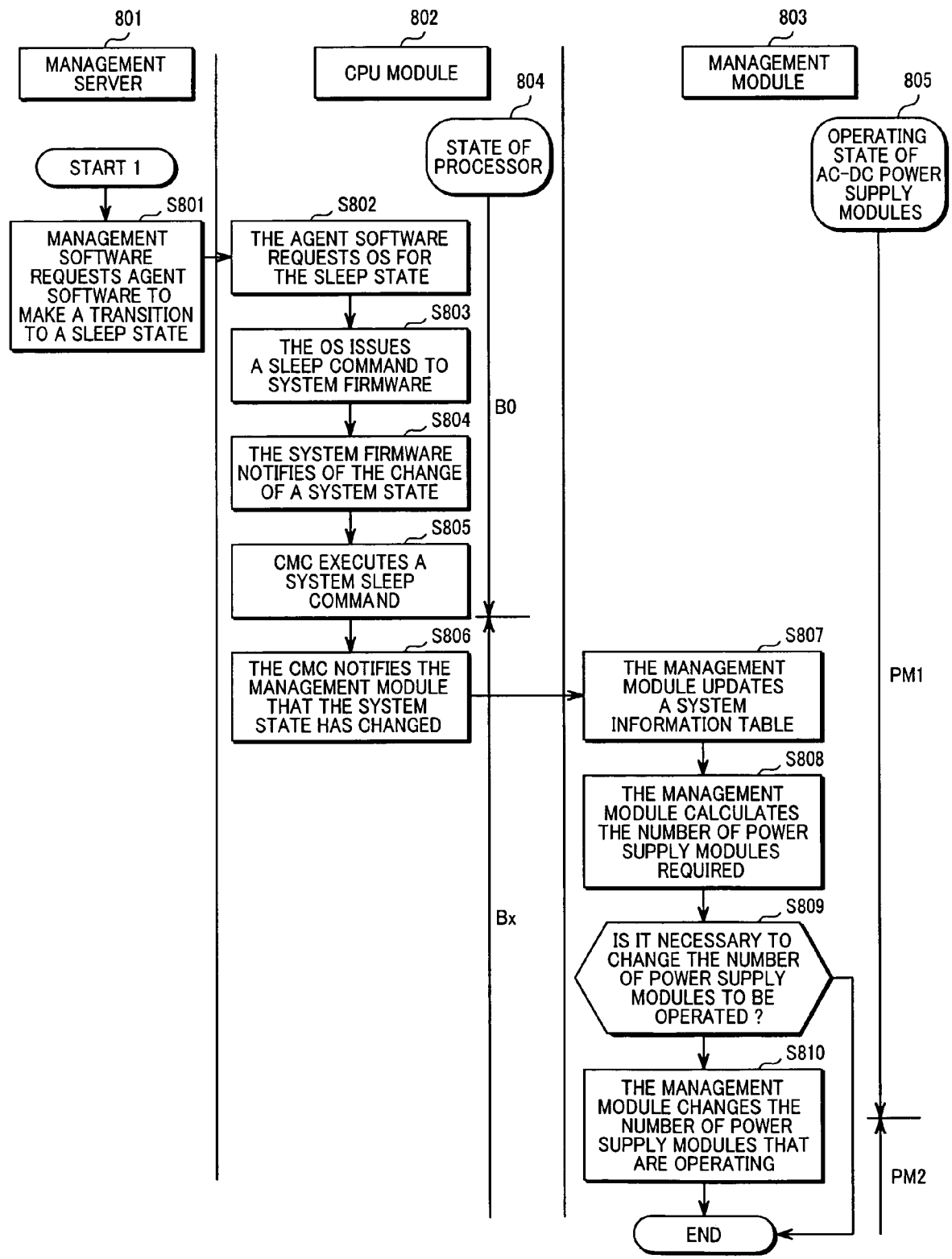
FIG. 8 is a flowchart illustrating a management method for managing AC-DC power supply modules applied in a case where a system state of the multiple computer equipment shown in FIG. 1 changes from the normal operation state to the sleep state.
Figure 10:
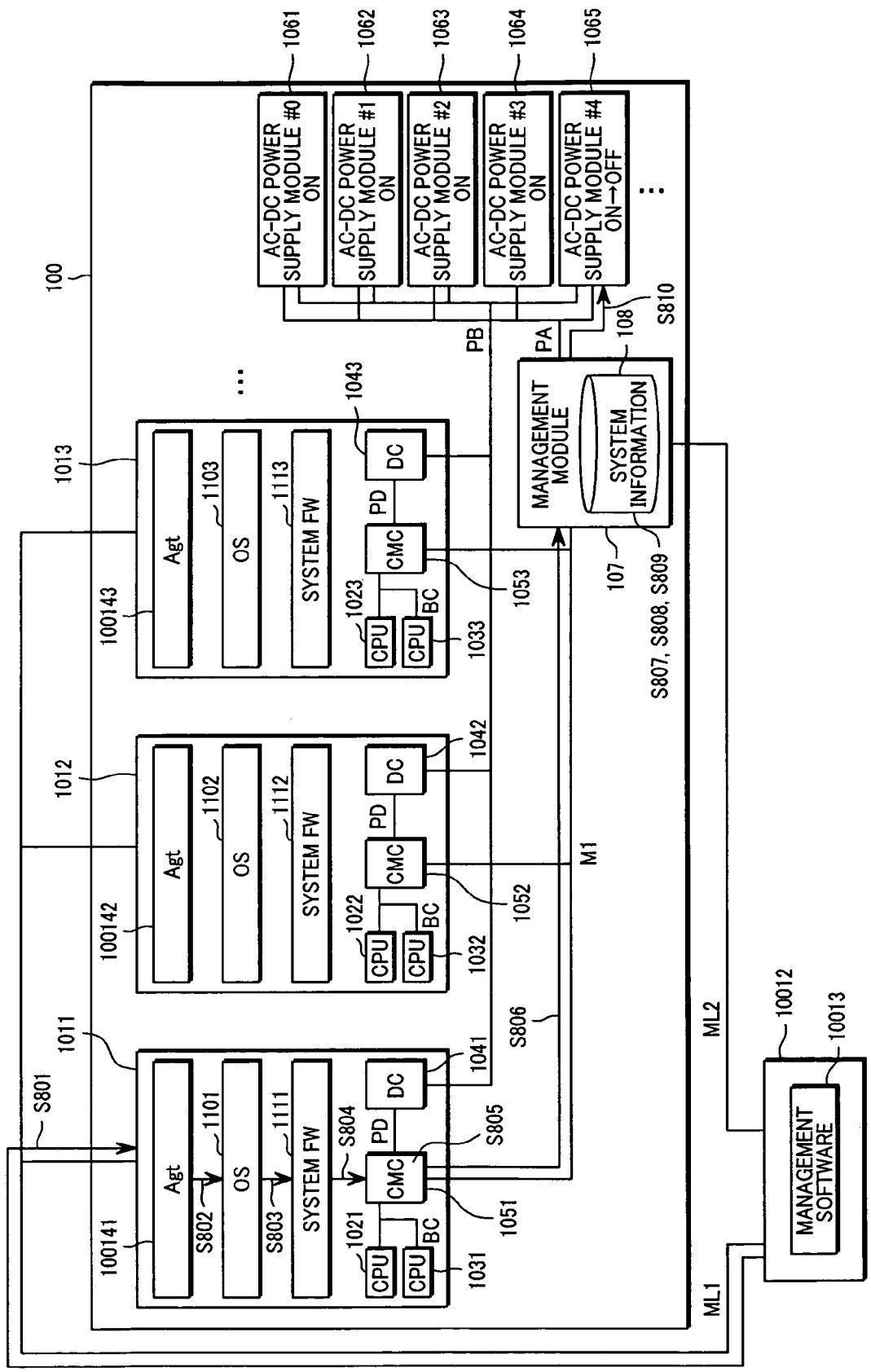
FIG. 10 is an explanatory diagram illustrating an example of a management method for managing AC-DC power supply modules applied in a case where the system state of the multiple computer equipment shown in FIG. 1 changes from the normal operation state to the sleep state.

Next, a management method for managing AC-DC power supply modules applied in a case where the system state changes from the normal operation state to the sleep state will be described. FIG. 8 is a flowchart illustrating a management method for managing-AC-DC power supply modules applied in a case where a system state of the multiple computer equipment shown in FIG. 1 changes from the normal operation state to the sleep state. FIG. 10 is an explanatory diagram illustrating an example of a management method for managing AC-DC power supply modules applied in a case where the system state of the multiple computer equipment shown in FIG. 1 changes from the normal operation state to the sleep state.

Components that are not included in the block diagram of FIG. 10 will be described below. A management server 10012 located outside the multiple computer equipment 100 is a server for managing the multiple computer equipment 100 and the other components of the computer system. The management server 10012 is equipped with management software 10013. The management server 10012 is connected to the CPU modules 1011, 1012, 1013, in the multiple computer equipment 100 through a management network ML1. In addition, the management server 10012 is connected to the management module 107 in the multiple computer equipment 100 through a network ML2 used for management. As the management networks ML1, ML2, for example, Ethernet is used. There is also a case where the CPU modules 1011, 1012, 1013, . . . are equipped with agent software 100141, 100142, 100143, . . . respectively as software for communicating with the management software 10013. The management software. 10013 communicates with the agent software 100141, 100142, 100143, . . . or the operation system 1101, 1102, 1103, . . . to manage, for example, the shutdown of the operation systems 1101, 1102, 1103, . . . of the CPU modules 1011, 1012, 1013, . . . , and acquisition of information about application software or settings of the application software. Moreover, the management software 10013 communicates with the management module to manage, for example, ON/OFF of the power supply of the CPU modules 1011, 1012, 1013, . . . , and acquisition of hardware configuration information.

FIG. 8 illustrates a flowchart of a management method for managing AC-DC power supply modules 1061, 1062, 1063, 1064, 1065, . . . shown in FIG. 10. This management method is applied in a case where a system state of the computer equipment comprising, for example, the CPU module 1011 shown in FIG. 10 changes from a normal operation state B0 to a sleep state Bx (x=1, 2, . . . ). In addition, FIG. 10 is a diagram used to explain the flowchart. It is to be noted that S801 through S810 described in FIG. 10 correspond to steps S801 through S810 included in the flowchart shown in FIG. 8. The management server 801 shown in FIG. 8 corresponds to the operation flow of the management server 10012 shown in FIG. 10; the CPU module 802 shown in FIG. 8 corresponds to the operation flow of the CPU module 1011 shown in FIG. 10; and the management module 803 shown in FIG. 8 corresponds to the operation flow of the management module 107 shown in FIG. 10. A system state 804 shown in FIG. 8 corresponds to a system state of the CPU module 1011 with respect to the operation flow. An operating state of AC-DC power supply modules 805 corresponds to a change in the number of AC-DC power supply modules that are operating. In the description of this embodiment, for example, five AC-DC power supply modules are operating in PM1; and four AC-DC power supply modules are operating in PM2.

Next, the flow of how a system state of the computer equipment comprising the CPU module 1011 changes from the normal operation state B0 to the sleep state Bx (x=1, 2, . . . ) will be described. As a result of, for example, a change in load of operation services, the management software 10013 included in the management server 10012 determines a system's sleep state Bx (x=1, 2, . . . ), to which the computer equipment makes a transition, so as to change the number of computer equipment to be operated. By use of the management network ML1, the management software 10013 requests the agent software 100141, which is operated by the CPU module 1011, to make a transition to the system's sleep state Bx (x=1, 2, . . . ) (step S801). By use of the software interface, the agent software 100141 requests the operation system 1101 for the sleep state Bx (x=1, 2, . . . ) to which the transition is made (step S802). By use of the software interface, the operation system 1101 issues to the system firmware 1111 a system sleep command to make a transition to the sleep state Bx (x=1, 2, . . . ) (step S803). By use of the software interface, the system firmware 1111 notifies the CPU module controller 1051 of the sleep state Bx (x=1, 2, . . . ) to which the transition is made (step S804). The CPU module controller 1051 executes the system sleep command so that the transition to the sleep state Bx (x=1, 2, . . . ) is made (step S805). As a result, a system state of the computer equipment comprising the CPU module 1011 changes from the normal operation state B0 to the sleep state Bx (x=1, 2, . . . ). By use of the communication path MI, the CPU module controller 1051 notifies the management module 107 that the system has made the transition to the sleep state Bx (x=1, 2, . . . ) (step S807). The management module 107 changes a state of the CPU module operation information FT2 to the sleep state Bx (x=1, 2, . . . ). The state of the CPU module operation information FT2 corresponds to the system that has made the transition to the sleep state. In addition, the management module 107 also changes a state of the processor state information FT3 to the system's sleep state SS. The state of the processor state information FT3 corresponds to the processor that has made the transition to the sleep state (step S807). Because the system information 108 has been updated, the management module 107 calculates the required power consumption on the basis of the system information 108 (information of FT2, FT3, and FT4), and also calculates the number of required AC-DC power supply modules (step S808). The management module 107 judges whether or not there is a change in the number of AC-DC power supply modules that are operating (step S809). If there is a change in the number of operating AC-DC power supply modules, the management module 107 controls the output of the AC-DC power supply modules 1061, 1062, 1063, 1064, 1065, . . . by use of the communication path PA used for control so that the number of operating AC-DC power supply modules is changed (step S810). In this embodiment, for example, the output of the AC-DC power supply module 1065 is stopped so that a state in which five AC-DC power supply modules 1061, 1062, 1063, 1064, 1065 are operating is changed to a state in which four AC-DC power supply modules are operating. On the other hand, if there is no change in the number of operating AC-DC power supply modules, the operation flow ends.

Figure 9:
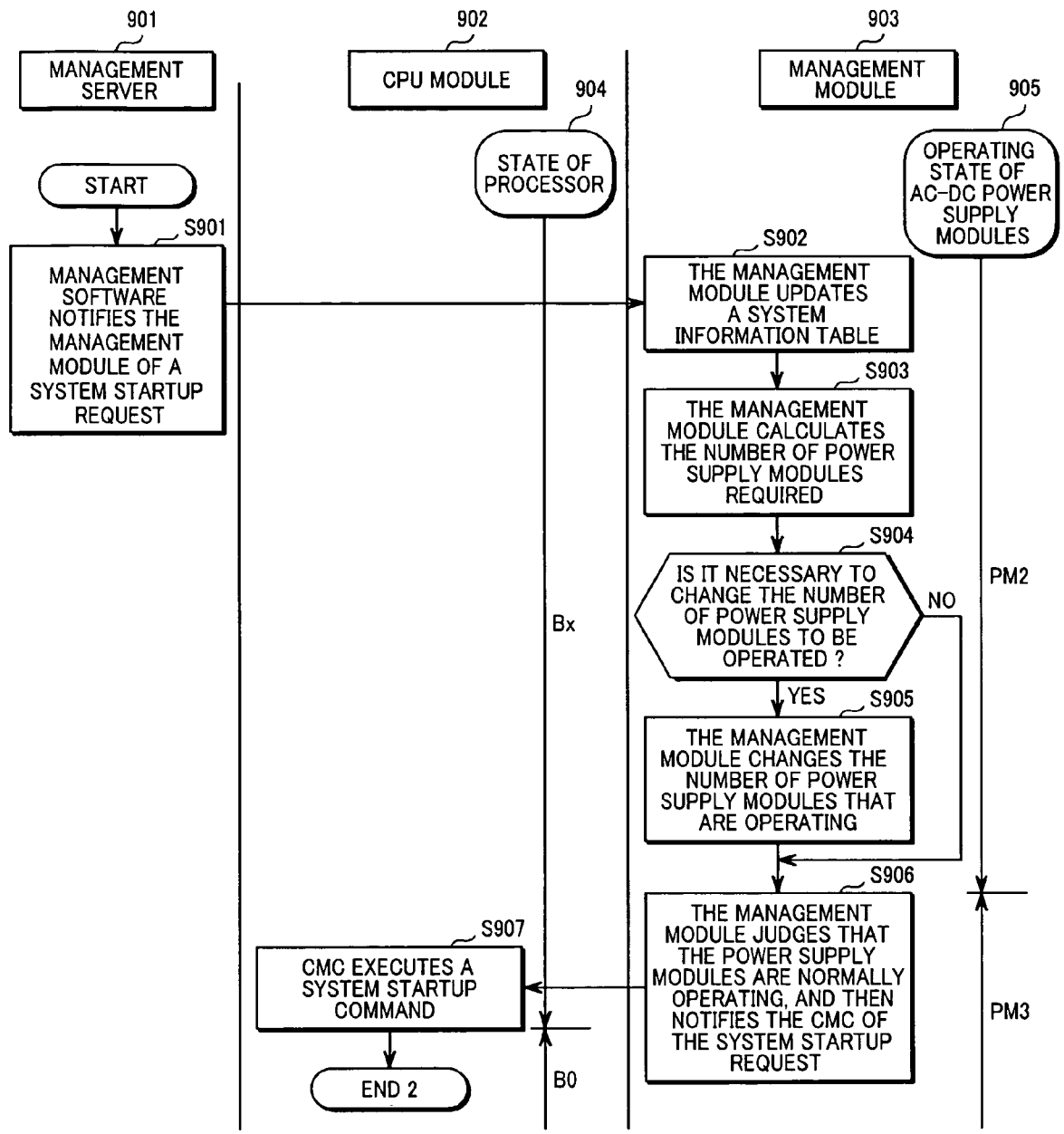
FIG. 9 is a flowchart illustrating a management method for managing AC-DC power supply modules applied in a case where the system state of the multiple computer equipment shown in FIG. 1 changes from the sleep state to the normal operation state.
Figure 11:
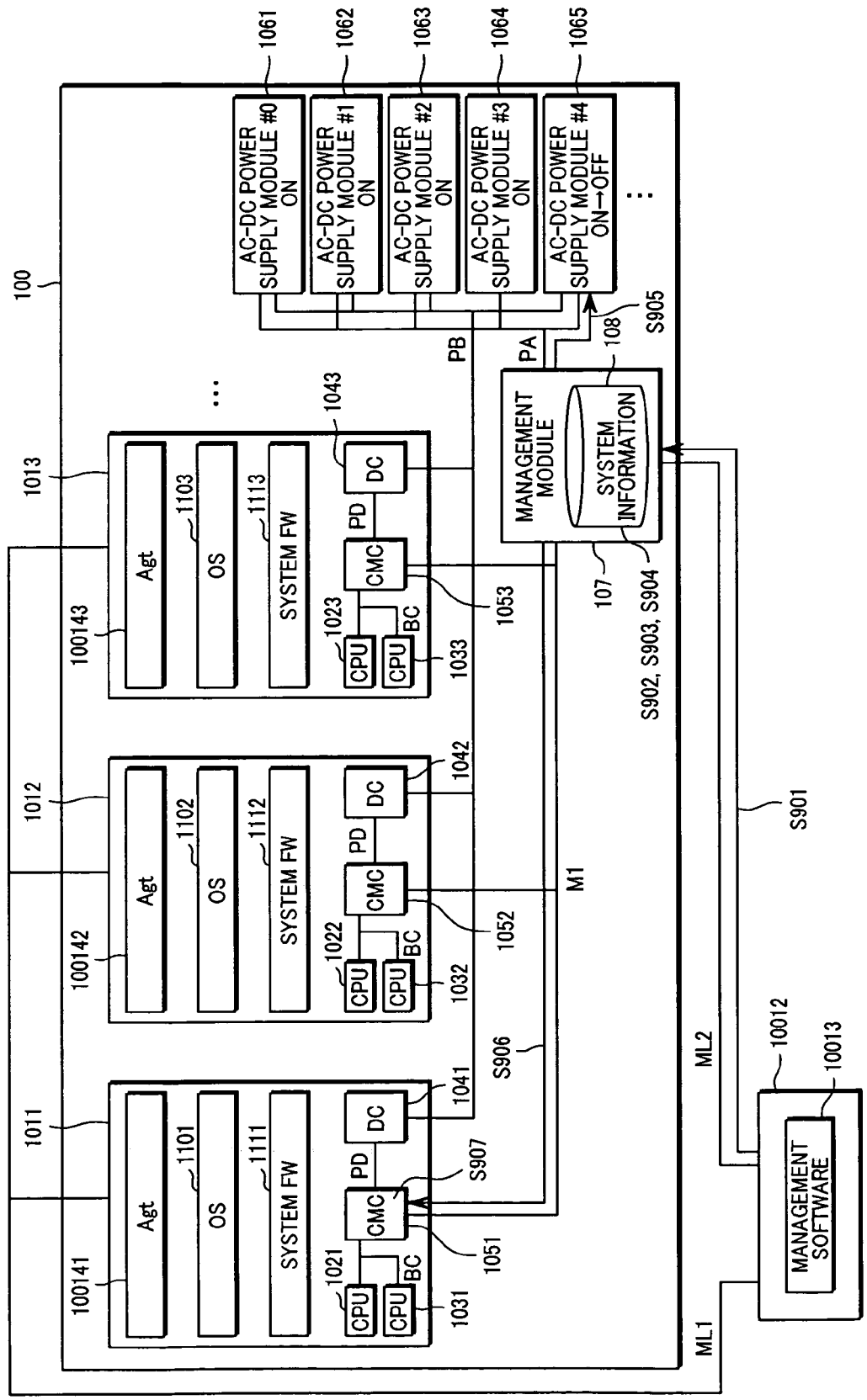
FIG. 11 is an explanatory diagram illustrating an example of a management method for managing AC-DC power supply modules applied in a case where the system state of the multiple computer equipment shown in FIG. 1 changes from the sleep state to the normal operation state.

Next, a management method for managing AC-DC power supply modules applied in a case where the system state changes from the sleep state to the normal-operation state will be described. FIG. 9 is a flowchart illustrating a management method for managing AC-DC power supply modules applied in a case where the system state of the multiple computer equipment shown in FIG. 1 changes from the sleep state to the normal operation state. FIG. 11 is an explanatory diagram illustrating an example of a management method for managing AC-DC power supply modules applied in a case where the system state of the multiple computer equipment shown in FIG. 1 changes from the sleep state to the normal operation state.

FIG. 9 illustrates a flowchart of a management method for managing AC-DC power supply modules 1061, 1062, 1063, 1064, 1065, . . . shown in FIG. 11, the management method being applied in a case where the system state of the computer equipment comprising, for example, the CPU module 1011 shown in FIG. 11 changes from the sleep state Bx (x=1, 2, . . . ) to the normal operation state B0. In addition, FIG. 11 is a diagram used to explain the flowchart. It is to be noted that S901 through S907 described in FIG. 11 correspond to steps S901 through S907 included in the flowchart shown in FIG. 9. The management server 901 shown in FIG. 9 corresponds to the management server 10012 shown in FIG. 11, illustrating the operation flow thereof; the CPU module 902 shown in FIG. 9 corresponds to the CPU module 1011 shown in FIG. 11, illustrating the operation flow thereof; and the management module 903 shown in FIG. 9 corresponds to the management module 107 shown in FIG. 11, illustrating the operation flow thereof. A system state 904 shown in FIG. 9 corresponds to a system state of the CPU module 1011 with respect to the operation flow. An operating state of AC-DC power supply modules 905 corresponds to a change in the number of AC-DC power supply modules that are operating. In the description of this embodiment, for example, four AC-DC power supply modules are operating in PM2; and five AC-DC power supply modules are operating in PM3.

Next, the flow of how the system state of the computer equipment comprising the CPU module 1011 changes from the sleep state Bx (x=1, 2, . . . ) to the normal operation state B0 will be described. The management software 10013 included in the management server 10012 decides to make a transition from the system's sleep state to the normal operation state so as to change the number of computer equipment to be operated based on a change in load of operation services. By use of the management network ML2, the management software 10013 requests the management module 107 to cause the CPU module 1011 to make a transition to the normal operation state B0 of the system, more specifically, to start up (step S901). The management module 107 changes a state in the CPU module operation information FT2 to the normal operation state B0, the state in the CPU module operation information FT2 corresponding to the system that makes the transition to the normal operation state. In addition, the management module 107 updates a state in the processor state information FT3 to the normal operation state A0, the state in the processor state information FT3 corresponding to the processor that has made the transition to the normal operation state B0 of the system (step S902). Because the system information 108 has been updated, the management module 107 calculates the required power consumption on the basis of the system information 108 (information of FT2, FT3, and FT4), and also calculates the number of required AC-DC power supply modules (step S903). The management module 107 judges whether or not there is a change in the number of AC-DC power supply modules that are operating (step S904). If there is a change in the number of operating AC-DC power supply modules, the management module 107 controls the output of the AC-DC power supply modules 1061, 1062, 1063, 1064, 1065 by use of the communication path PA used for control so that the number of operating AC-DC power supply modules is changed (step S905). In this embodiment, for example, the output of the AC-DC power supply module 1065 is turned ON so that a state in which four AC-DC power supply modules 1061, 1062, 1063, 1064 are operating is changed to a state in which five AC-DC power supply modules are operating. On the other hand, if there is no change in the number of operating AC-DC power supply modules, the process returns to the operation flow in the step S906. Using the communication path PA used for control, the management module 107 judges that the AC-DC power supply modules 1061, 1062, 1063, 1064, 1065 normally supply the power, and then notifies the CPU module controller 1051 of the completion of settings of the AC-DC power supply modules (step 906). The CPU module controller 1051 executes a system startup command for starting up the computer equipment comprising the CPU module 1011 (step S907). As a result, the system state of the computer equipment comprising the CPU module 1011 changes from the system's sleep state Bx (x=1, 2, ...) to the normal operation state B0.

Figure 12:
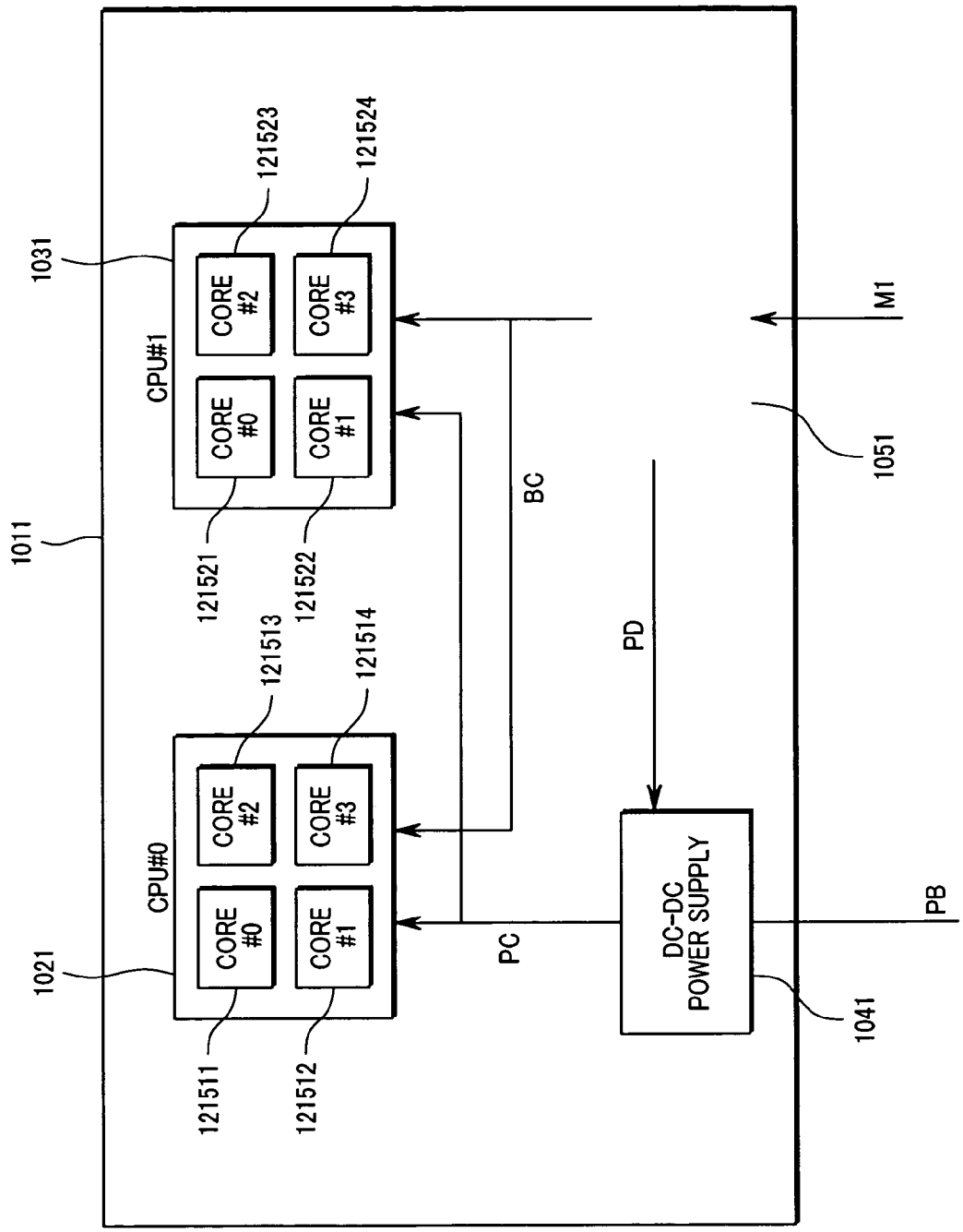
FIG. 12 is a block diagram illustrating a CPU module included in the multiple computer equipment shown in FIG. 1, each processor of the CPU module having a multi-core structure.
Figure 13:
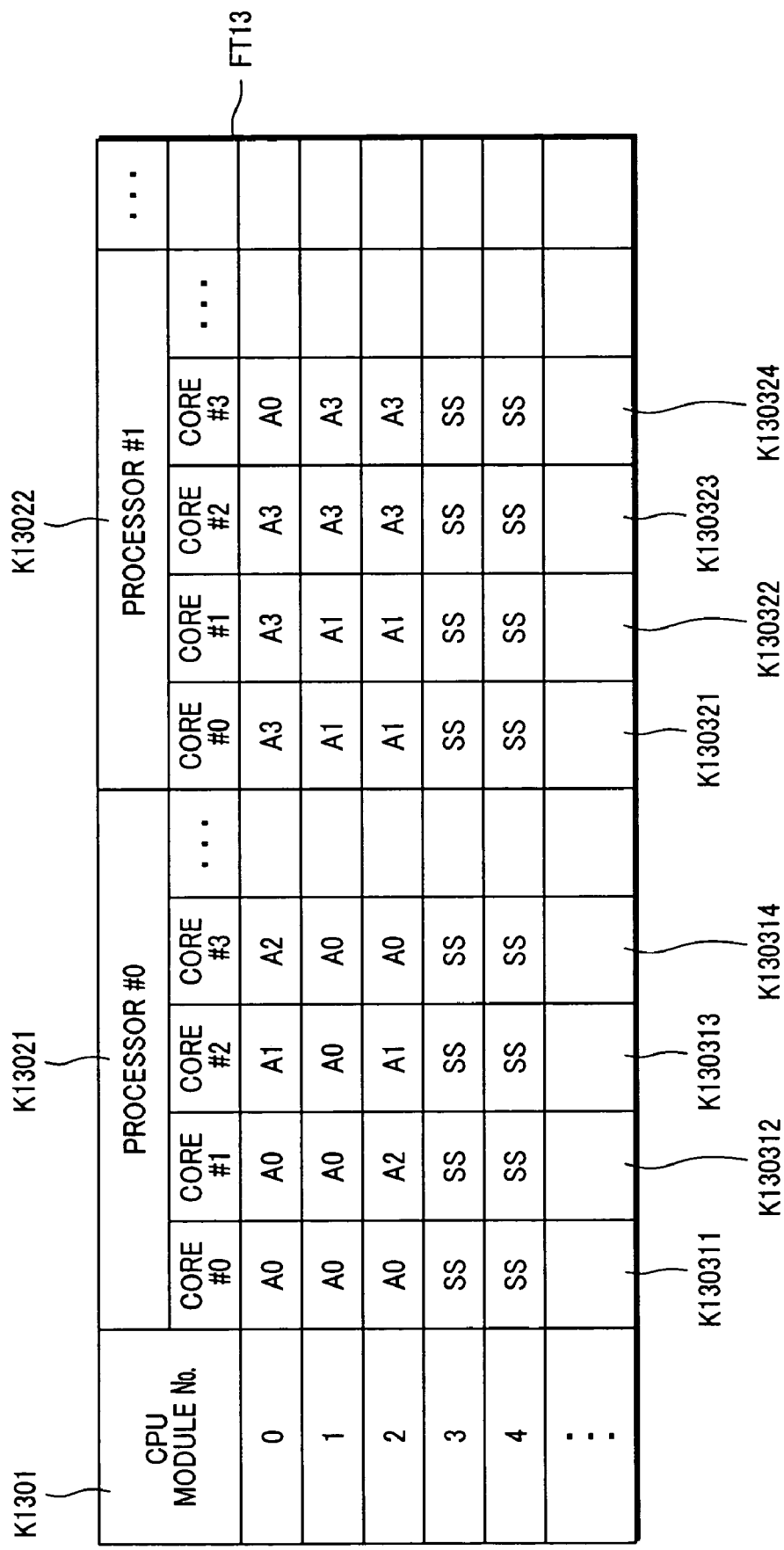
FIG. 13 is an explanatory diagram illustrating an example of processor state information held by the management module, the processor state information being provided in a case where each processor of the CPU module included in the multiple computer equipment shown in FIG. 1 has a multi-core structure.

Described next will be a configuration of the multiple computer equipment, and a management method for managing AC-DC power supply modules, applied in a case where processors included in the CPU modules 1011, 1012, 1013, ... have a multi-core structure in the multiple computer equipment according to one embodiment of the present invention shown in FIG. 1. FIG. 12 is a block diagram illustrating a CPU module included in the multiple computer equipment shown in FIG. 1, each processor of the CPU module having a multi-core structure. FIG. 13 is an explanatory diagram illustrating an example of processor state information held by the management module, the processor state information being provided in a case where each processor of the CPU module included in the multiple computer equipment shown in FIG. 1 has a multi-core structure.

When the CPU module 1011 shown in FIG. 12 is taken into consideration here, it can be replaced with the CPU module 1011 illustrated in, for example, FIGS. 1, 6, 7, 10, 11. In FIG. 12, the CPU module 1011 has a configuration in which, for example, the processor 1021 includes two or more processor cores 121511, 121512, 121513, 121514, ..., and the processor 1031 includes two or more processor cores 121521, 121522, 121523, 121524 .... In addition, as shown in FIG. 13, processor operation information FT3 shown in the FIG. 3, which is included in the management module 107, is changed so that the processor operation information FT13 has processor core states each corresponding to each of the processor cores 121511, 121512, 121513, 121514, ..., 121521, 121522, 121523, 121524, .... To be more specific, if the processor state information FT13 shown in FIG. 13 is expressed in tabular form, FT13 includes the columns of: CPU module number K1301; and processor state information K13021, K13022, ..., the processor being included in each slot of a CPU module. Further, the processor state information includes the columns of processor core state information K130311, K130312, K130313, K130314, K130321, K130322, K130323, K130324, .... Each row of the CPU module number K301 corresponds to, for example, each of the CPU modules 1011, 1012, 1013, ... shown in FIG. 1. The processor core state information K130311, K130312, K130313, K130314, ..., K130321, K130322, K130323, K130324, indicates a normal operation state, or a sleep state (including a system sleep state), of each processor core in each processor included in the CPU module. In this embodiment, as is the case with the processor state information FT3, A0 denotes a normal operation state of a processor; Ax (x=1, 2, 3, ...) denotes a sleep state of the processor; and SS denotes a system sleep state (including a power OFF state of the system). If each processor included in the CPU modules 1011, 1012, 1013, has a multi-core structure, the required power consumption is calculated on a multi-core state basis by use of the processor state information FT13. When the required power consumption is calculated, the same calculation method as that used in the description of the processor state information FT3 is used. In addition, the management method for managing AC-DC power supply modules have only to be changed in two ways: as the calculation method for calculating the power consumption, the required power consumption is calculated on a multi-core state basis; and a state transition made on a processor basis is changed to a state transition that is made on a processor core basis.

Figure 14:
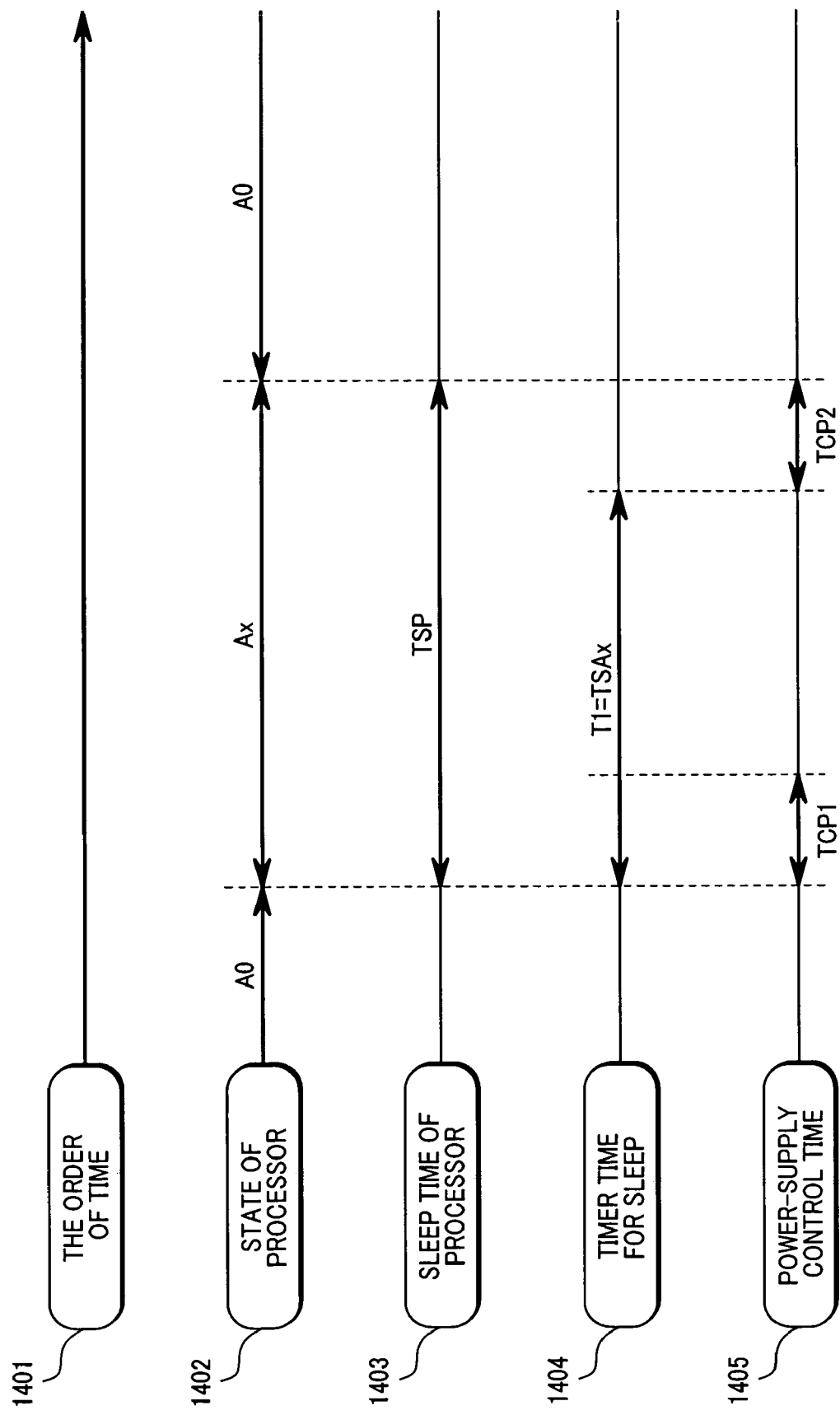
FIG. 14 is an explanatory diagram illustrating a method for determining, on the basis of the typical sleep time, the timer set time for the sleep state of the processor included in the multiple computer equipment shown in FIG. 1.
Figure 15:
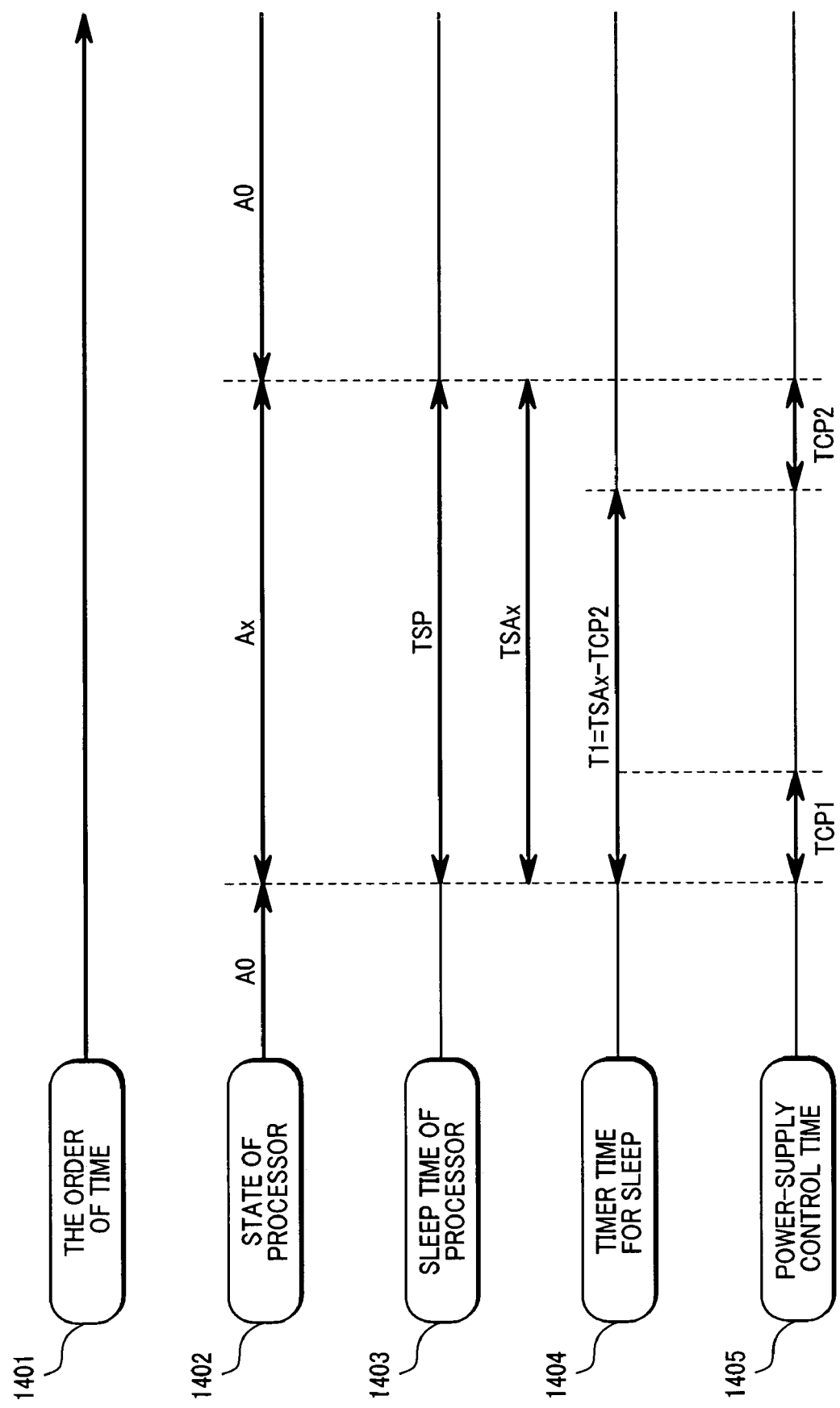
FIG. 15 is an explanatory diagram illustrating a method for determining, on the basis of the typical sleep time in which the control time for controlling the power supply is taken into consideration, the timer set time for the sleep state of the processor included in the multiple computer equipment shown in FIG. 1.
Figure 16:
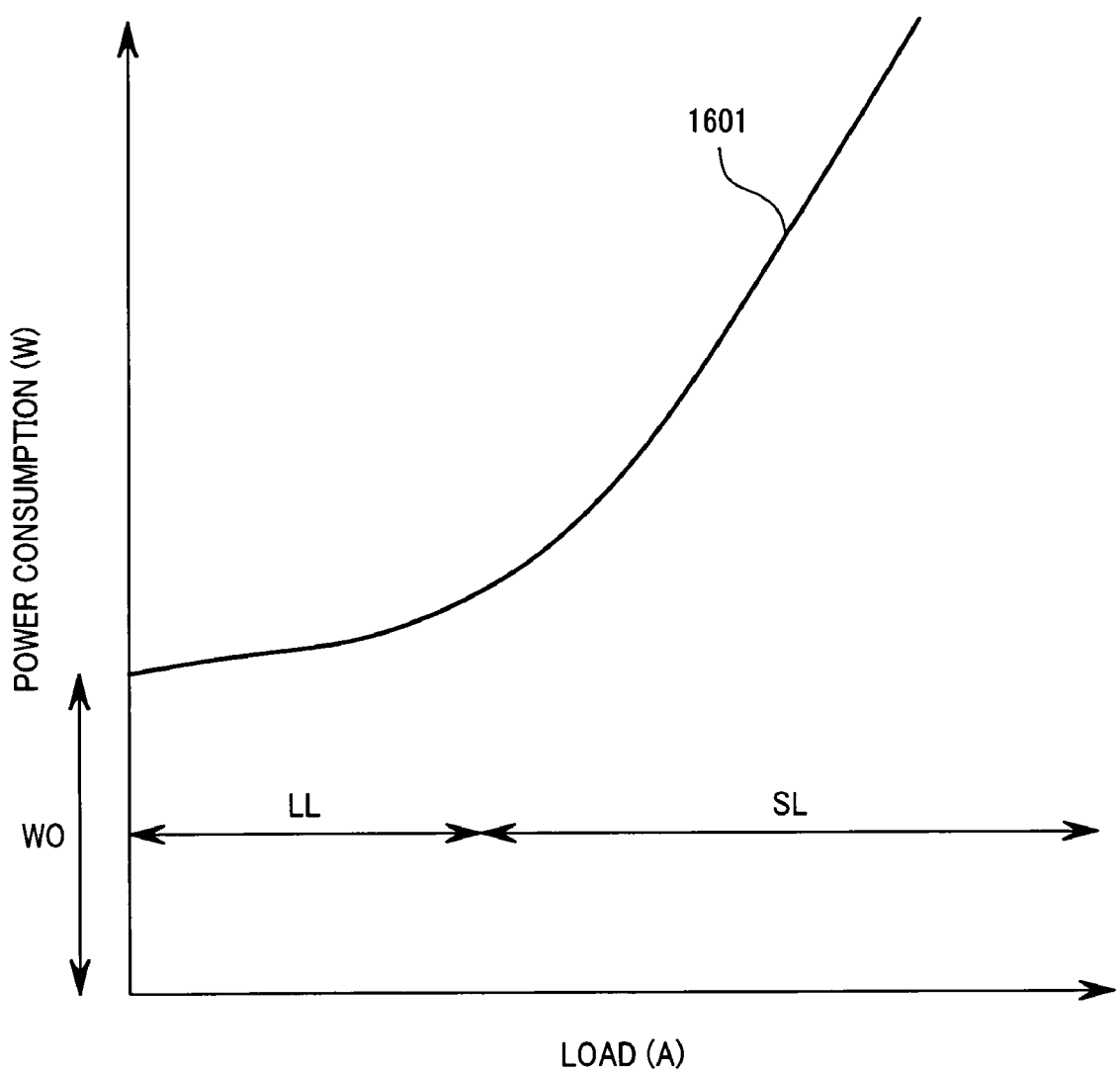
FIG. 16 is a graph illustrating the relationship between a load of a typical AC-DC power supply module and the power consumption.

Next, a method for determining the timer set time T1 of a timer for counting the sleep time corresponding to the processor's sleep state Ax (x=1, 2, 3, ...) will be described. FIG. 14 is an explanatory diagram illustrating a method for determining, on the basis of the typical sleep time, the timer set time for a sleep state of a processor included in the multiple computer equipment shown in FIG. 1. FIG. 15 is an explanatory diagram illustrating a method for determining, on the basis of the typical sleep time in which the control time for controlling the power supply is taken into consideration, the timer set time for a sleep state of a processor included in the multiple computer equipment shown in FIG. 1. In FIGS. 14, 15, the order of time 1401 indicates a direction in which the time moves. In the figures, the time moves from left to right. A processor state 1402 indicates, for example, a processor state of the processor 1021. In examples shown in FIGS. 14, 15, a case where the processor state changes from the normal operation state A0 to the sleep state Ax (x=1, 2, 3, ...), and then the processor state returns to the normal operation state A0, is described. The sleep time of processor 1403 indicates the actual sleep time TSP during which a processor is actually in a sleep state. This sleep time of processor coincides with a length of time of the sleep state Ax (x=1, 2, 3, ...). The timer time for sleep 1404 indicates the timer set time T1 at which the CPU module controller 1051 sets the timer. The power-supply control time 1405 indicates the control time TCP1, TCP2 during which AC-DC power supply modules are controlled. In this case, the control time TCP1, TCP2 starts when the management module 107 receives a notification that a processor state has changed. Then, the management module 107 changes the number of AC-DC power supply modules 1061, 1062, 1063, 1064, 1065, ... to be operated. The control time TCP1, TCP2 ends when the management module 107 completes the checking of the output of the AC-DC power supply modules to be operated. To be more specific, the AC-DC power supply module control time TCP1 corresponds to a period of time during which the steps S505 through S509 shown in FIG. 5 are executed; and the AC-DC power supply module control time TCP2 corresponds to a period of time during which the steps S510 through S515 shown in FIG. 5 are executed. In the method for determining the timer set time T1 shown in FIG. 14, the processor sleep time (the typical sleep time) TSAx (x=1, 2, 3, ...) before the present invention is applied is adopted as T1. In this case, the actual sleep time TSP is calculated as follows: TSP=T1+TCP2=TSAx+TCP2. Thus, the length of time during which a sleep state continues is longer than the typical sleep time TSAx (x=1, 2, 3, ...) by the AC-DC power supply module control time TCP2. On the other hand, in the method for determining the timer set time T1 shown in FIG. 15, the length of time which is adopted as T1 is obtained by subtracting the AC-DC power supply module control time TCP2 from the processor sleep time TSAx (x=1, 2, 3, ...) before the present invention is applied. In this case, the actual sleep time TSP is calculated as follows: TSP=T1+TCP2=TSAx−TCP2+TCP2=TSAx. Thus, a period of time during which a sleep state continues is the typical sleep time TSAx (x=1, 2, 3, ...) which is the same as that used when the present invention is applied. However, because the timer set time T1 can be freely specified by a vendor of equipment as a value specific to computer equipment, this determination method is not always applied to all cases according to the present invention.

Described next will be how to determine the power consumption that is specified as the power consumption information K4021, K4022, K4023, K4024, ... of the processor states A0, A1, A2, A3, ..., which are included in the processor power-consumption information FT4. On the assumptions that the sleep time corresponding to processors states A0, A1, A2, A3, . . . of a certain processor, for example, a processor corresponding to CP1, is TAx (x=1, 2, 3, . . . ), the power consumption is PAx (x=0, 1, 2, 3, . . . ), and the power consumption described in the processor power-consumption information FT4 is MPAx (x=0, 1, 2, 3, . . . ), the relationship between the sleep time TAx (x=1, 2, 3, . . . ) and the power consumption PAx (x=0, 1, 2, 3, . . . ) is in general given as follows:

TA1<TA2<TA3<

PA0>PA1>PA2>PA3>

More specifically, with the increase in value of x, the sleep time TAx (x=1, 2, 3, . . . ) becomes longer; and with the increase in value of x, the power consumption PAx (x=0, 1, 2, 3, . . . ) becomes smaller. Here, to determine the power consumption MPAx (x=0, 1, 2, 3, . . . ) included in the processor power-consumption information FT4, for example, if the sleep time TAx (x=1, 2, 3, . . . ) is smaller than the total AC-DC power supply module control time TCP (=TCPl+ TCP2) (TAx<TCP), the power consumption MPAx (x=0, 1, 2, 3, . . . ), which is included in the processor power-consumption information FT4, is set as follows: MPAx=PA0. If the sleep time TAx (x=1, 2, 3, . . . ) is longer than the total AC-DC power supply module control time TCP (TAx>TCP), the power consumption MPAx (x=0, 1; 2, 3, . . . ), which is included in the processor power-consumption information FT4, is set as follows: MPAx=PAx. As a result of determining, according to this method, the power consumption MPAx (x=0, 1, 2, 3, . . . ) that is included in the processor power-consumption information FT4, if the sleep time TAx (x=1, 2, 3, . . . ) is shorter than the total AC-DC power supply module control time TCP, the AC-DC power supply modules are not controlled. Therefore, it is possible to prevent the sleep time from becoming longer as a result of the control of the AC-DC power supply modules.

On the other hand, the way of thinking applied to the above method for determining the power consumption information corresponding to the processor states A0, A1, A2, A3, . . . can also be applied to a method for determining the power consumption specified in the power consumption information K4031, K4032, K4033, K4034, . . . , which correspond to the system states B0, B1, B2, B3, respectively. However, as described above, the sleep time corresponding to each sleep state can be freely specified by a vendor of equipment as a value specific to computer equipment. Therefore, this determination method is not always applied to all cases according to the present invention.

Figure 17:
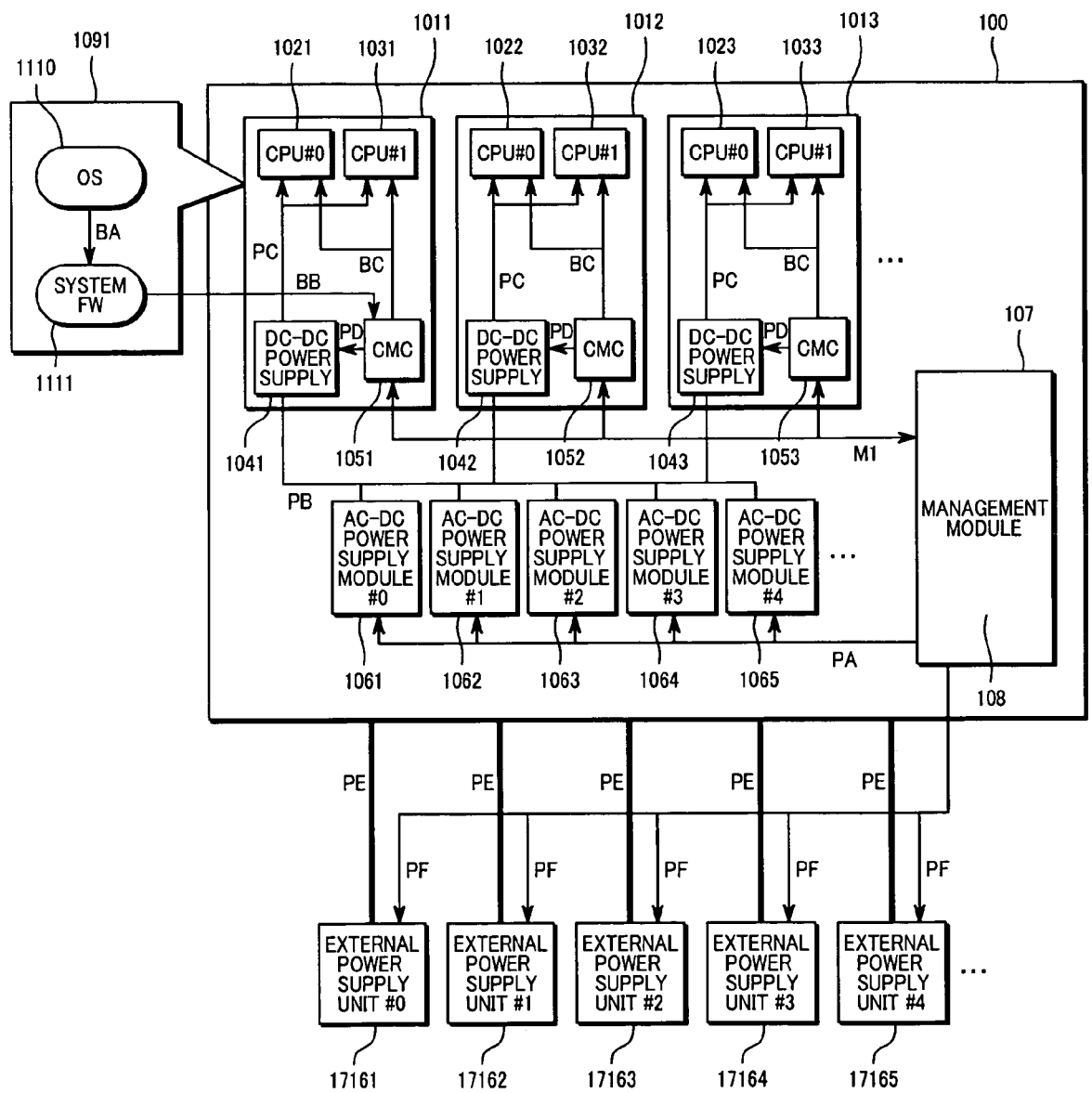
FIG. 17 is a block diagram illustrating multiple computer equipment according to a second embodiment of the present invention.

Next, how multiple computer equipment according to a second embodiment of the present invention is configured will be described. FIG. 17 is a block diagram illustrating the multiple computer equipment according to the second embodiment of the present invention. In the second embodiment, external power supply units 17161, 17162, 17163, 17164, 17165, . . . are added to the configuration according to the first embodiment of the present invention shown in FIG. 1. Here, the external power supply units are power supply units provided on the power supply side of the multiple computer equipment. The power supply units include, for example, a breaker power supply unit, and an uninterruptive power supply unit. As shown in FIG. 17, the external power supply units 17161, 17162, 17163, 17164, 17165, . . . , are connected to the multiple computer equipment through power supply lines PE so that the electric power is supplied to AC-DC power supply modules 1061, 1062, 1063, 1064, 1065, . . . . As is the case with the first embodiment, the management module 107 determines the number of AC-DC power supply modules 1061, 1062, 1063, 1064, 1065, . . . to be operated. In addition to it, from the number of operating AC-DC power supply modules, the management module 107 calculates the number of external power supply units 17161, 17162, 17163, 17164, 17165, . . . to be operated for the multiple computer equipment 100. In response to the result of the calculation, the management module 107 controls the number of operating external power supply unit 17161, 17162, 17163, 17164, 17165, . . . by use of interfaces PF for controlling the external power supply units. Such control makes it possible to operate the external power supply units 17161, 17162, 17163, 17164, 17165, . . . , the number of which is the required minimum number for the multiple computer equipment 100. This enables a reduction in wasteful power consumption.

The invention devised by this inventor was specifically described on the basis of the embodiments as above. However, the present invention is not limited to the embodiments. As a matter of course, the present invention can be changed in various ways within the range that does not deviate from points thereof.

For example, computer equipment located outside the multiple computer equipment 100 may also have the functions included in the management module 107 in the above-mentioned embodiment. In addition, the power supply modules 1061, 1062, 1063, 1064, 1065, . . . may also be provided outside the multiple computer equipment 100. Moreover, the CPU modules 1011, 1012, 1013, . . . in the multiple computer equipment 100 may also take the place of the management server 10012.

What is claimed is:

1. Multiple computer equipment comprising:
   at least one CPU module comprising a processor, and a DC-DC power supply for supplying power to the processor;
   AC-DC power supply modules each being connected to a corresponding one of the CPU modules, each of said AC-DC power supply modules comprising an AC-DC power supply unit for supplying a required amount of power to the DC-DC power supply in response to an operation state of the processor;
   a CPU module controller included in the CPU module, said CPU module controller controlling power supply even when the processor is not operating, said CPU module controller being connected to the AC-DC power supply modules through a power supply control interface so as to control the output of the AC-DC power supply modules; and
   a management module which is connected to the CPU module controller through a management interface so as to control the power supply of the CPU module;
   wherein said management module:
   holds system information including status information of the processor, operation information of the CPU module, and power consumption information provided on a processor kind basis;
   on the basis of the system information, calculates power consumption required for each of the CPU modules;
   calculates the number of operating AC-DC power supply modules required to ensure the calculated power consumption; and
   on the basis of the result of the calculation, determines the number of AC-DC power supply modules to be operated.

2. The multiple computer equipment according to claim 1, wherein:

said CPU module controller notifies the management module that a state of the processor has changed; and on the basis of the notification, said management module updates system information held in the management module; on the basis of the updated system information, said management module calculates the number of AC-DC power supply modules to be operated; and on the basis of the result of the calculation, said management module determines the number of AC-DC power supply modules to be operated.

3. The multiple computer equipment according to claim 1, wherein:

said power consumption information provided on a processor basis includes a normal operation state, a sleep state (high-speed return), a sleep state (low-speed return), and a stop state; and the capacity of the power supply required for each of the states is determined on the basis of ON/OFF switching operation speed of the AC-DC power supply modules.

4. The multiple computer equipment according to claim 1, wherein:

from the power consumption required for each of the CPU modules, which is calculated on the basis of the system information, said management module judges whether or not a required external power supply unit can be operated, and on the basis of the result of the judgment, said management module controls the operation of the external power supply unit.

5. Multiple computer equipment comprising:

at least one AC-DC power supply module comprising an AC-DC power supply unit, said AC-DC power supply module supplying electric power to each equipment;

a CPU module comprising: at least one processor; a DC-DC power supply for DC-DC converting electric power supplied from the AC-DC power supply module; and a CPU module controller for controlling the power supply even when the processor is not operating, said CPU module controller being connected to the AC-DC-power supply module through a power supply control interface so as to control the output of the AC-DC power supply module;

a management module which is connected through a management interface so as to control the power supply of the CPU module; and an operation system and system firmware, both of which operate on a CPU module basis when the power supply of the CPU module is turned ON, wherein:

if said processor has a sleep state, said processor has either at least one state as a sleep state of the processor, or at least one state as a system sleep state provided on a CPU module basis;

if a state of the processor changes from a normal operation state to a sleep state, said CPU module controller comprises:

a timer function of keeping the processor state in the sleep state for a fixed period of time by a command for making a transition to the sleep state, said command being issued from the system firmware; and a function of notifying the management module that the processor state has changed;

if the processor state changes from the sleep state to the normal operation state, said CPU module controller comprises:

a function of, on completion of the timer function, notifying the management module that the processor state has changed; and a function of, on receipt of a notification from the management module that settings of the AC-DC power supply module have been completed, sending the processor an interrupt request to return from the sleep state to the normal operation state;

said management module comprises, as system information, CPU module operation information including: CPU module power ON or OFF; a normal operation state and a sleep state of a system of the CPU module; and information about a kind of included processor;

as processor information, said management module comprises: processor state information including a normal operation state and a sleep state of a processor in the CPU module; and processor power-consumption information that is required for each state on a processor kind basis; and if the processor state changes from the normal operation state to the sleep state, or if the processor state changes from the sleep state to the normal operation state, said management module comprises:

a control function of: on receipt of a notification from the CPU module controller that the processor state has changed, calculating the power consumption required for the whole multiple computer equipment from the CPU module operation information, the processor state information, and the processor power-consumption information; on the basis of the power consumption, calculating the number of AC-DC power supply modules to be operated; and if it is necessary to change the number of AC-DC power supply modules that are operating, changing the number of operating AC-DC power supply modules that are operating; and a notification function of notifying the CPU module controller of the completion of settings, said completion of settings indicating that the AC-DC power supply modules are stably operating.

6. The multiple computer equipment according to claim 5, wherein:

in the case of having the sleep state of the system, if the system state changes from the normal operation state to the sleep state, said CPU module controller comprises:

a function of notifying the management module that the processor state has been changed by a transition command for making the transition to the sleep state, said transition command being issued from the system firmware;

if the system state changes from the sleep state to the normal operation state, said CPU module controller comprises:

a function of starting up the CPU module on receipt of a startup request to start up the CPU module, said startup request being issued from the management module;

if the system state changes from the normal operation state to the sleep state, said management module comprises:

a control function of: on the receipt of a notification from the CPU module controller that the system state has changed, calculating the power consumption required for the whole multiple computer equipment from the CPU module operation information, the processor state information, and the processor power-consumption information; on the basis of the power consumption, calculating the number of AC-DC power-supply modules to be operated; and if it is necessary to change the number of AC-DC power supply modules that are operating, changing the number of AC-DC power supply modules that are operating; and if the system state changes from the sleep state to the normal operation state, said management module comprises:
  a function of receiving a power-on request to power on the CPU module;
  a control function of: calculating the power consumption required for the whole multiple computer equipment from the CPU module operation information, the processor state information, and the processor power-consumption information; on the basis of the power consumption, calculating the number of AC-DC power supply modules to be operated; and if it is necessary to change the number of AC-DC power supply modules that are operating, changing the number of AC-DC power supply modules that are operating; and
  a function of sending the CPU module controller the startup request to start up the CPU module.

7. The multiple computer equipment according to claim 5, wherein:
  if a processor included in the CPU module has two or more processor cores,
  as the processor state information, said management module includes: a normal operation state, and a sleep state, for each core of a processor included in the CPU module; and a normal operation state, and a sleep state, of a system of the CPU module; and
  said management module includes a control function of: on the basis of said information, when a transition is made from the normal operation state of the processor to the sleep state, calculating the power consumption required for the whole multiple computer equipment; on the basis of the power consumption, calculating the number of AC-DC power supply modules to be operated; and if it is necessary to change the number of AC-DC power supply modules that are operating, changing the number of AC-DC power supply modules that are operating.

8. The multiple computer equipment according to claim 5, wherein:
  on the basis of the calculated power consumption required for the whole multiple computer equipment, said management module judges whether or not a required external power supply unit can be operated, and on the basis of the result of the judgment, said management module controls the operation of the external power supply unit.

9. A management method of multiple computer equipment, said multiple computer equipment comprising:
  at least one AC-DC power supply module for supplying electric power to the whole equipment;
  a CPU module comprising: at least one processor; a DC-DC power supply for DC-DC converting the electric power supplied from the AC-DC power supply module; and a CPU module controller for controlling the power supply even when the processor is not operating, said CPU module controller being connected to the AC-DC power supply module through a power supply control interface so as to control the output of the AC-DC power supply module;
  a management module which is connected through a management interface so as to control the power supply of the CPU module; and
  an operation system and system firmware, both of which operate on a CPU module basis when the power supply of the CPU module is turned ON, wherein:
  if said processor has a sleep state, said processor has either at least one state as a sleep state of the processor, or at least one state as a system sleep state provided on a CPU module basis;
  if the processor state changes from a normal operation state to the sleep state,
    said operation system operating on the CPU module performs the step of: issuing to the system firmware a command for changing the processor state from the normal operation state to the sleep state;
    on receipt of the command, said system firmware operating on the CPU module performs the steps of: notifying the CPU module controller that the processor state has changed; and performing the sleep control of the processor;
    said CPU module controller performs the step of: notifying the processor-management module that the processor state has changed; and
    on receipt of this notification, said processor management module performs the steps of:
      updating processor state information including a normal operation state, and the sleep state, of the processor in the processor CPU module;
      calculating the power consumption required for the whole multiple computer equipment from information including: the processor state information; CPU module operation information including a power ON/OFF state of the processor CPU module, the normal operation state, and the sleep state, of the system of the processor CPU module, and information about a kind of included processor; and processor power-consumption information required for each state on a processor kind basis;
      on the basis of the power consumption, calculating the number of AC-DC power supply modules to be operated; and
      if it is necessary to change the number of AC-DC power supply modules that are operating, changing the number of AC-DC power supply modules that are operating.

10. The management method of the multiple computer equipment according to claim 9, wherein:
  if said processor has the sleep state of the processor and the processor state changes from the sleep state to the normal operation state,
  as a result of the time out of a timer set by the CPU module controller, the management module is notified that the processor state has changed;
  on the receipt of this notification, said management module performs the steps of: updating the processor state information; calculating the power consumption required for the whole multiple computer equipment from the processor state information, the operation information, and the processor power-consumption information; on the basis of the power consumption, calculating the required number of AC-DC power supply modules to be operated; and if it is necessary to change the number of AC-DC power supply modules that are operating, changing the number of AC-DC power supply modules that are operating;
  after checking the operation state of the AC-DC power supply modules, said management module performs the step of: notifying the CPU module controller that the control of the AC-DC power supply modules has been completed: and on receipt of the notification, said CPU module controller performs the step of: sending the processor an interrupt signal that causes the processor state to change to the normal operation state.

11. The management method of the multiple computer equipment according to claim 9, wherein:
if said processor has the sleep state of the system and the system state changes from the normal operation state to the sleep state,
said operation system operating on the CPU module performs the step of: issuing to the system firmware a command for changing the system state from the normal operation state to the sleep state;
on receipt of the command, said system firmware operating on the CPU module performs the steps of: notifying the CPU module controller that the system state has changed; and performing the sleep control of the system;
said CPU module controller performs the step of: notifying the management module that the system state has changed; and
on receipt of this notification, said management module performs the steps of: updating the processor state information and the CPU module operation information; calculating the power consumption required for the whole multiple computer equipment from the processor state information, the CPU module operation information, and the processor power-consumption information; calculating the number of AC-DC power supply modules to be operated; and if it is necessary to change the number of AC-DC power supply modules that are operating, changing the number of AC-DC power supply modules that are operating;

12. The management method of the multiple computer equipment according to claim 9, wherein:
if said processor has the system sleep state and the system state changes from the sleep state to the normal operation state,
said management module performs the steps of: on receipt of a power-on request to power on the CPU module, updating the processor state information and the CPU module operation information; calculating the power consumption required for the whole multiple computer equipment from the processor state information, the CPU module operation information, and the processor power-consumption information; on the basis of the power consumption, calculating the number of AC-DC power supply modules to be operated; and if it is necessary to change the number of AC-DC power supply modules that are operating, changing the number of AC-DC power supply modules that are operating;
after checking the operation state of the AC-DC power supply modules, said management module performs the step of: issuing a CPU module power-on command to the CPU module controller; and
on receipt of the CPU module power-on command, said CPU module controller performs the step of: starting up the CPU module.

13. The management method of the multiple computer equipment according to claim 9, wherein:
if a processor included in the CPU module has two or more processor cores,
as the processor state information, said management module includes: a normal operation state, and a sleep state, for each core of a processor included in the CPU module; and a normal operation state, and a sleep state, of a system of the CPU module; and
on the basis of the information, when a transition is made from the normal operation state of the processor to the sleep state, said management module calculates the power consumption required for the whole multiple computer equipment.

14. The management method of the multiple computer equipment according to claim 9, wherein:
the number of AC-DC power supply modules to be operated, which is calculated by the management module from the power consumption required for the whole multiple computer equipment, is specified as the number obtained by adding one to the required minimum number of AC-DC power supply modules that can supply the required power consumption; and on the basis of the number of AC-DC power supply modules to be operated, the number of AC-DC power supply modules that are operating is controlled.

15. The management method of the multiple computer equipment according to claim 9, wherein:
the sleep time of the processor used by a timer function of the CPU module controller is set at the time from which the control time required to control the AC-DC power supply modules by the management module is subtracted.

16. The management method of the multiple computer equipment according to claim 9, wherein:
the processor power-consumption information held by the management module is such that, in the relationship between the sleep time of the processor and the control time required to control the AC-DC power supply modules by the management module, if the sleep time of the processor is longer than the control time, the power consumption is specified as 0 W or a value of power consumption at the time of the sleep state of the processor, whereas if the sleep time of the processor is shorter than the control time, the power consumption is specified as a value of power consumption at the time of the normal operation state of the processor.

17. The management method of the multiple computer equipment according to claim 9, wherein:
on the basis of the calculated power consumption required for the whole multiple computer equipment, said management module judges whether or not a required external power supply unit can be operated, and on the basis of the result of the judgment, said management module controls the operation of the external power supply unit.

* * * * *